US012753808B2

(12) United States Patent
Iraschko

(10) Patent No.: US 12,753,808 B2
(45) Date of Patent: Oct. 6, 2026

(54) DRUM BRAKE

(71) Applicant: KNORR-BREMSE Systeme fuer Nutzfahrzeuge GmbH, Munich (DE)

(72) Inventor: Johann Iraschko, Schweitenkirchen (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 390 days.

(21) Appl. No.: 18/565,822

(22) PCT Filed: Jun. 10, 2022

(86) PCT No.: PCT/EP2022/065867

§ 371 (c)(1),
(2) Date: Nov. 30, 2023

(87) PCT Pub. No.: WO2022/263324

PCT Pub. Date: Dec. 22, 2022

(65) Prior Publication Data

US 2024/0247694 A1 Jul. 25, 2024

(30) Foreign Application Priority Data

Jun. 18, 2021 (DE) ..................... 10 2021 115 785.4

(51) Int. Cl.
*F16D 51/14* (2006.01)
*B60T 13/38* (2006.01)
(Continued)

(52) U.S. Cl.
CPC .............. *F16D 51/14* (2013.01); *B60T 13/38* (2013.01); *F16D 51/12* (2013.01); *F16D 65/22* (2013.01);
(Continued)

(58) Field of Classification Search
CPC .......... F16D 51/12; F16D 51/14; F16D 65/22; F16D 65/562; F16D 2121/04; F16D 2121/06; F16D 2125/66; B60T 13/38
(Continued)

(56) References Cited

U.S. PATENT DOCUMENTS 1,838,188 A 12/1931 Morgan
1,968,667 A 7/1934 White
(Continued)

FOREIGN PATENT DOCUMENTS

CN 207687222 U 8/2018
DE 666 237 A 10/1938
(Continued)

OTHER PUBLICATIONS

International Preliminary Report on Patentability (PCT/IB/338 & PCT/IB/373) issued in PCT Application No. PCT/EP2022/065867 dated Dec. 28, 2023, including English translation of (German-language Written Opinion (PCT/ISA/237), filed on Nov. 20, 2023) (11 pages).
(Continued)

*Primary Examiner* — Christopher P Schwartz
(74) *Attorney, Agent, or Firm* — Crowell & Moring LLP

(57) ABSTRACT

A drum brake, in particular for a utility vehicle, has a brake drum, which is rotatably mounted about a rotational axis, and multiple brake shoes, which are mounted in a receiving area of the brake drum and each of which has a friction lining support and a friction lining arranged thereon. The brake shoes can be pressed against a brake drum casing inner surface, which is designed as a friction surface, in a radial direction relative to a rotational axis of the brake drum. The interior of the drum brake is equipped with a brake cylinder assembly which is rotationally fixed to an armature housing for actuating the brake shoes. A respective pressing wedge
(Continued)

is arranged on the friction lining support face facing away from the friction lining. The pressing wedge lies on a wedge mechanism which can be moved in a parallel manner relative to the rotational axis of the brake drum. The wedge mechanism can be moved from a non-braking position into a braking position by moving the service brake piston of the brake cylinder assembly in a parallel manner relative to the rotational axis of the brake drum.

19 Claims, 20 Drawing Sheets

(51) Int. Cl.

| | |
|---|---|
| ***F16D 51/12*** | (2006.01) |
| ***F16D 65/22*** | (2006.01) |
| ***F16D 65/56*** | (2006.01) |
| *F16D 121/04* | (2012.01) |
| *F16D 121/06* | (2012.01) |
| *F16D 125/66* | (2012.01) |

(52) U.S. Cl.
CPC ........ *F16D 65/562* (2013.01); *F16D 2121/04* (2013.01); *F16D 2121/06* (2013.01); *F16D 2125/66* (2013.01)

(58) Field of Classification Search
USPC ........................ 188/72.7, 326, 331, 335, 343
See application file for complete search history.

(56) References Cited

U.S. PATENT DOCUMENTS

| | | | | |
|---|---|---|---|---|
| 1,995,534 A | 3/1935 | Brunton et al. | | |
| 2,527,126 A | 10/1950 | Goepfrich et al. | | |
| 2,701,626 A * | 2/1955 | Walther, Sr. | F16D 55/2245 | 188/71.6 |
| 3,187,849 A * | 6/1965 | Deibel | F16D 65/091 | 192/96 |
| 4,030,576 A * | 6/1977 | Pringle | F16D 65/74 | 188/72.3 |
| 2003/0164272 A1 | 9/2003 | Chun | | |
| 2008/0000736 A1 | 1/2008 | Bruch | | |
| 2011/0233010 A1 | 9/2011 | Drewes | | |
| 2019/0107161 A1 | 4/2019 | Drewes | | |
| 2026/0043443 A1* | 2/2026 | Schroepf | F16D 51/14 | |

FOREIGN PATENT DOCUMENTS

| | | | |
|---|---|---|---|
| DE | 21 39 494 A | 3/1972 | |
| DE | 101 31 817 A1 | 1/2003 | |
| DE | 102 60 599 A1 | 10/2003 | |
| DE | 102 30 008 A1 | 1/2004 | |
| DE | 10 2010 003 250 A1 | 9/2011 | |
| DE | 10 2015 203 440 A1 | 9/2016 | |
| EP | 1 873 418 A2 | 1/2008 | |
| SU | 920291 A1 | 4/1982 | |
| SU | 1 542 171 A1 | 3/1995 | |
| WO | WO-2025228999 A1 * | 11/2025 | F16D 65/22 |

OTHER PUBLICATIONS

International Search Report (PCT/ISA/210) issued in PCT Application No. PCT/EP2022/065867 dated Oct. 21, 2022 with English translation (4 pages).
German-language Written Opinion (PCT/ISA/237) issued in PCT Application No. PCT/EP2022/065867 dated Oct. 21, 2022 with English translation (11 pages).
German-language Office Action issued in German Application No. 10 2021 115 785.4 dated Jan. 19, 2022 (6 pages).
German-language Opposition issued in German Application No. 10 2021 115 785.4 dated Aug. 18, 2023 (28 pages).

* cited by examiner d)

c)

DRUM BRAKE

BACKGROUND AND SUMMARY

The present invention relates to a drum brake, in particular for a utility vehicle.

Drum brakes of the generic type have a cylindrical drum-shaped rotor, with friction surfaces arranged on the inner side of the rotor which is also called a brake drum. Here, a brake force is generated by way of brake shoes which are pressed against the inner friction surface of the brake drum.

What is known as the simplex drum brake is to be mentioned as the simplest and currently frequently used embodiment of a drum brake. In the case of this simplex drum brake, two brake shoes are pressed hydraulically or mechanically onto the drum by way of an application apparatus which acts on the brake shoes on one side, for example with the aid of a cam, an expansion lock, spreading wedge or spreading lever.

Here, the two brake shoes are mounted rotatably on opposite sides of the application apparatus. On account of the geometric arrangement, different forces which are dependent on the rotational direction of the brake drum result on the two brake shoes which are arranged so as to lie opposite one another.

While, in the case of what is known as the leading brake shoe, the mounting of which lies behind a friction lining of the brake shoe in the rotational direction of the brake drum, the pressing force is boosted by way of the lever action which results from the position of the brake shoe bearing, a reverse effect results at what is known as the trailing brake shoe.

Accordingly, a predominant part of the braking work is performed by the leading brake shoe in the case of this drum brake.

This results in an inhomogeneous distribution of the pressing force and the thermal loading on the two brake shoes, which has the consequence that the wear of the friction lining of the two brake shoes is of different magnitude.

One disadvantage of the self-boosting action also lies in the fact that what is known as the brake coefficient (C* value) rises disproportionately to the coefficient of friction of the friction lining. Due to this, considerably different brake forces can occur at the wheels and axles of the vehicle to be braked.

Drum brakes of this type have the advantage on the other hand that the brake shoes are not exposed directly to the surroundings, and therefore the influence of dirt, spray water and road salt on the effect and the state of the brake shoes is considerably lower than, for example, in the case of disk brakes.

Therefore, drum brakes are more suitable than disk brakes, for example, for off-road use.

A further advantage of drum brakes consists in that, in the case of drum brakes, practically no residual wear torque occurs, since, in the case of this brake design, the brake shoes are withdrawn actively into a non-braking position by way of brake shoe restoring springs as a matter of principle, and therefore dragging of the brake shoes, as occurs in the case of brake pads of disk brakes, can be ruled out.

A further advantage of drum brakes consists in it being possible for the abrasion of the friction lining to be collected and therefore the surrounding area or environment to be relieved of brake dust of this type and, moreover, for the irreversible loss of valuable material elements which are incorporated in the friction lining of brake shoes to be avoided.

In order to reduce the self-boosting action, it is known, for example, from DE 10 2010 003 250 A1, for two brake shoes which are arranged so as to lie opposite one another to be pressed radially with respect to the rotational axis of the brake drum against the shell inner surface of the brake drum along a brake carrier with the aid of an actuating element.

It is an object of the present invention to develop a drum brake with a more compact construction.

This object is achieved by way of a drum brake with the features of the independent claims.

The drum brake according to the invention has a brake drum which is mounted rotatably about a rotational axis, and a plurality of brake shoes which are mounted in a receiving space of the brake drum with a respective friction lining carrier and a friction lining arranged on the latter.

It is possible for the brake shoes to be pressed radially with respect to a rotational axis of the brake drum onto a shell inner surface, configured as a friction surface, of the brake drum.

A brake cylinder arrangement which is arranged fixedly on an armature housing for conjoint rotation is provided in the receiving space of the drum brake, for actuating the brake shoes.

A respective pressure wedge which lies on a wedge mechanism which can be displaced parallel to the rotational axis of the brake drum is arranged on a side of the friction lining carriers which faces away from the friction lining.

It is possible for the wedge mechanism to be displaced out of a non-braking position into a braking position by way of displacement of a service brake piston of the brake cylinder arrangement parallel to the rotational axis of the brake drum.

A drum brake which is configured in this way is distinguished by its compact design.

In particular, the space for the brake cylinder which is usually arranged outside the brake drum can be saved, since this is now arranged within the drum brake, without it being necessary for the volume of the drum brake to be increased considerably.

A multiplicity of further advantages result from the movement conversion of the movement of the wedge mechanism parallel to the rotational axis of the brake drum into the radial movement of the brake shoe.

A lever effect which influences the brake shoes in the case of an otherwise customary pivoting movement of the brake shoes is thus decreased by way of the radial movement of the brake shoes and by way of the short length of the brake shoes which is used in comparison with the prior art and which is considered in the circumferential direction.

Furthermore, a stable friction behavior and a homogeneous abrasion of the friction linings are ensured by way of the brake shoes being pressed on radially.

In contrast to conventional drum brakes and also disk brakes, the lining wear on the individual brake shoes is identical, since all the brake shoes are actuated or loaded in the same way as a matter of principle.

Advantageous design variants of the invention are the subject matter of the dependent claims.

In accordance with one advantageous design variant, the brake cylinder arrangement has a housing which is fastened to the armature housing in a stationary manner in the receiving space of the brake drum, a service brake piston which can be displaced relative to the housing parallel to the rotational axis of the brake drum, a parking brake piston which can be displaced relative to the housing parallel to the rotational axis of the brake drum and is loaded with the spring force of a spring element, and a plunger for transmitting a movement of the parking brake piston to the service brake piston.

Here, respective compressed air feeds are provided in a service brake pressure space between the housing and the service brake piston, and in a parking brake pressure space between the housing and the parking brake piston.

The spring element thus makes a reliable parking brake function possible in conjunction with the parking brake pressure space.

In accordance with a further design variant, the plunger is received in a dividing wall of the housing, which dividing wall separates the service brake pressure space from the parking brake pressure space.

In an alternative design variant, the plunger is received in a dividing wall of the housing, which dividing wall separates the service brake pressure space from the receiving space.

Both variants make a reliable brake actuation possible in the case of discharging of the compressed air in the parking brake pressure space.

Depending on the installation situation, the two variants make it possible to fix the spring element which is preferably configured as a disk spring on a radially outer or a radially inner edge of the spring element.

In accordance with one preferred development of the drum brake according to the invention, a respective pressure wedge which lies on a tapered ring which can be displaced parallel to the rotational axis of the brake drum is arranged on a side of the friction lining carriers which faces away from the friction lining.

In accordance with a further preferred design variant, the tapered ring can be adjusted via an adjusting device.

To this end, in one preferred development, a thread is arranged, in particular molded, on a surface of the tapered ring which faces away from the pressure wedge, which thread meshes with a threaded sleeve of the adjusting device.

Here, it is possible for the threaded sleeve to be displaced together with the tapered ring parallel to the rotational axis of the brake drum by way of displacement of the service brake piston of the brake cylinder arrangement.

This firstly makes it possible for the threaded sleeve to be driven during a braking operation in the case of displacement of the threaded sleeve parallel to the rotational axis of the brake drum.

Secondly, an adjustment of the tapered ring relative to the threaded sleeve is made possible by way of rotation of the threaded sleeve, which, depending on the wear state of the friction lining of the brake shoes, sets the tapered ring in such a way that the running clearance of the drum brake can always be kept constant.

Here, in accordance with one preferred design variant, the threaded sleeve is coupled via a toothed rim of the threaded sleeve to an adjuster drive.

In accordance with a further preferred design variant, a slide with a plurality of rolling bodies is arranged between the pressure wedge and the tapered ring, which slide makes it possible to decrease a friction resistance between the pressure wedge and the pressing surface of the tapered ring.

In accordance with an alternative design variant, the wedge mechanism has a number of wedge plates which can be displaced parallel to the rotational axis of the brake drum, which number corresponds to the number of brake shoes.

In accordance with one preferred development, each of the wedge plates has a pressure surface which faces the pressure wedge of the respective brake piston, and two sliding surfaces which are oriented at an angle with respect to one another and against which tapered rings in each case bear which mesh on oppositely oriented threads of a threaded sleeve of the adjusting device, it being possible for the threaded sleeve to be displaced axially together with the wedge plates and the tapered rings parallel to the rotational axis of the brake drum by way of displacement of the service brake piston of the brake cylinder arrangement.

This makes homogeneous radial lifting of the wedge plates possible in order to adjust the brake shoes as a consequence of lining wear.

As an alternative, it is also contemplated that the sliding surfaces of the sliding plate which are oriented at an angle with respect to one another are oriented in such a way that a tapered ring bears against one of the sliding surfaces, which tapered ring meshes on a thread of the threaded sleeve of the adjusting device, and the other one of the sliding surfaces bears against a wall which projects radially out of the threaded sleeve.

This variant also makes homogeneous radial lifting of the wedge plates possible in order to adjust the brake shoes.

For the adjusting movement of the brake shoes, the threaded sleeve has a toothed rim which is coupled to an adjuster drive. By way of rotation of the threaded sleeve in an adjusting direction, the tapered rings approach one another or the first tapered ring approaches the wall, and thus presses the wedge plates radially with respect to the rotational axis of the brake drum in the direction of the shell inner surface of the brake drum.

In another alternative design variant, the brake shoes can be adjusted radially directly via the adjusting device.

In accordance with a first variant, a piston which is fixed so as not to rotate and has an internal thread extends to this end from the friction lining carrier of the brake shoe. In the piston, a threaded plunger which can be adjusted by way of the adjusting device by rotation about a radial rotational axis is received by way of an external thread, on which threaded plunger the pressure wedge of the respective brake shoe is arranged.

In a second variant, the adjustable piston which has an internal thread can be rotated by way of the adjusting device by rotation about a radial rotational axis, and a threaded plunger which is fixed so as not to rotate is received by way of an external thread in the piston.

In order to drive the piston or the threaded plunger, in accordance with one preferred design variant, the adjusting device has a toothed rim and an adjuster drive which is coupled to an internal toothing system of the toothed rim. The toothed rim has, furthermore, a crown gear toothing system which meshes with an external toothing system of the rotatable threaded plunger or of the rotatable piston of the respective brake shoe.

In the following text, preferred exemplary embodiments will be explained in greater detail on the basis of the appended drawings.

DETAILED DESCRIPTION OF THE DRAWINGS

In the following description of the figures, terms such as top, bottom, left, right, front, rear, etc. relate exclusively to the exemplary illustration and position, selected in the respective figures, of the drum brake, brake drum, brake shoe, brake cylinder, tapered ring, threaded sleeve and the like. These terms are not to be understood as restrictive, that is to say these references can change as a result of different working positions or the mirror-symmetrical design or the like.

Figure 1:
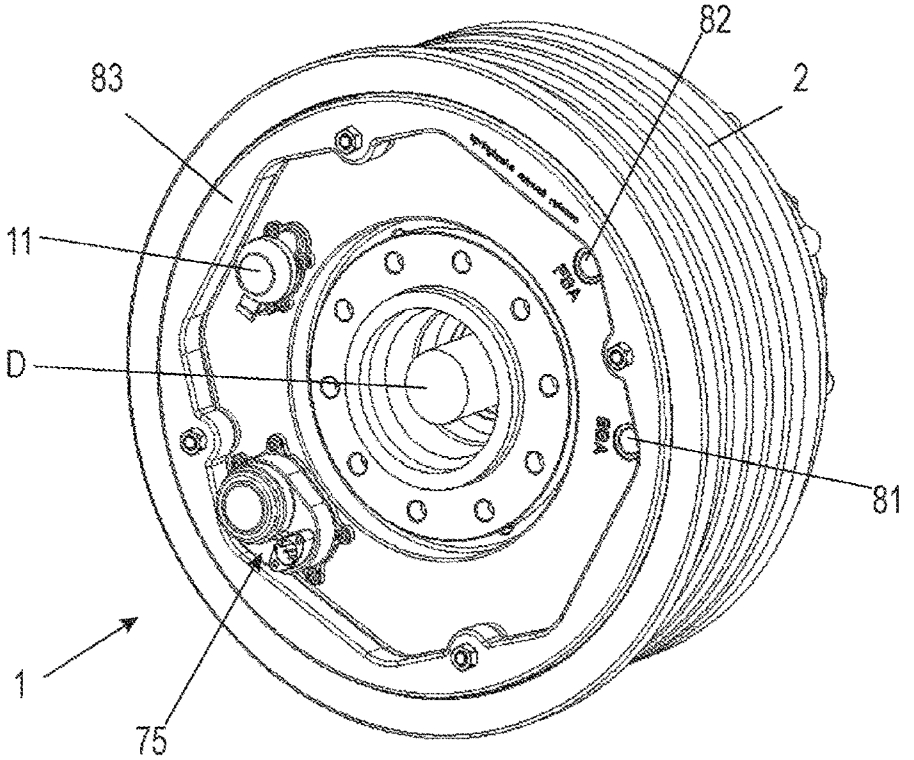
FIG. 1 shows an isometric illustration of one design variant of a drum brake according to an embodiment of the invention.
Figure 3:
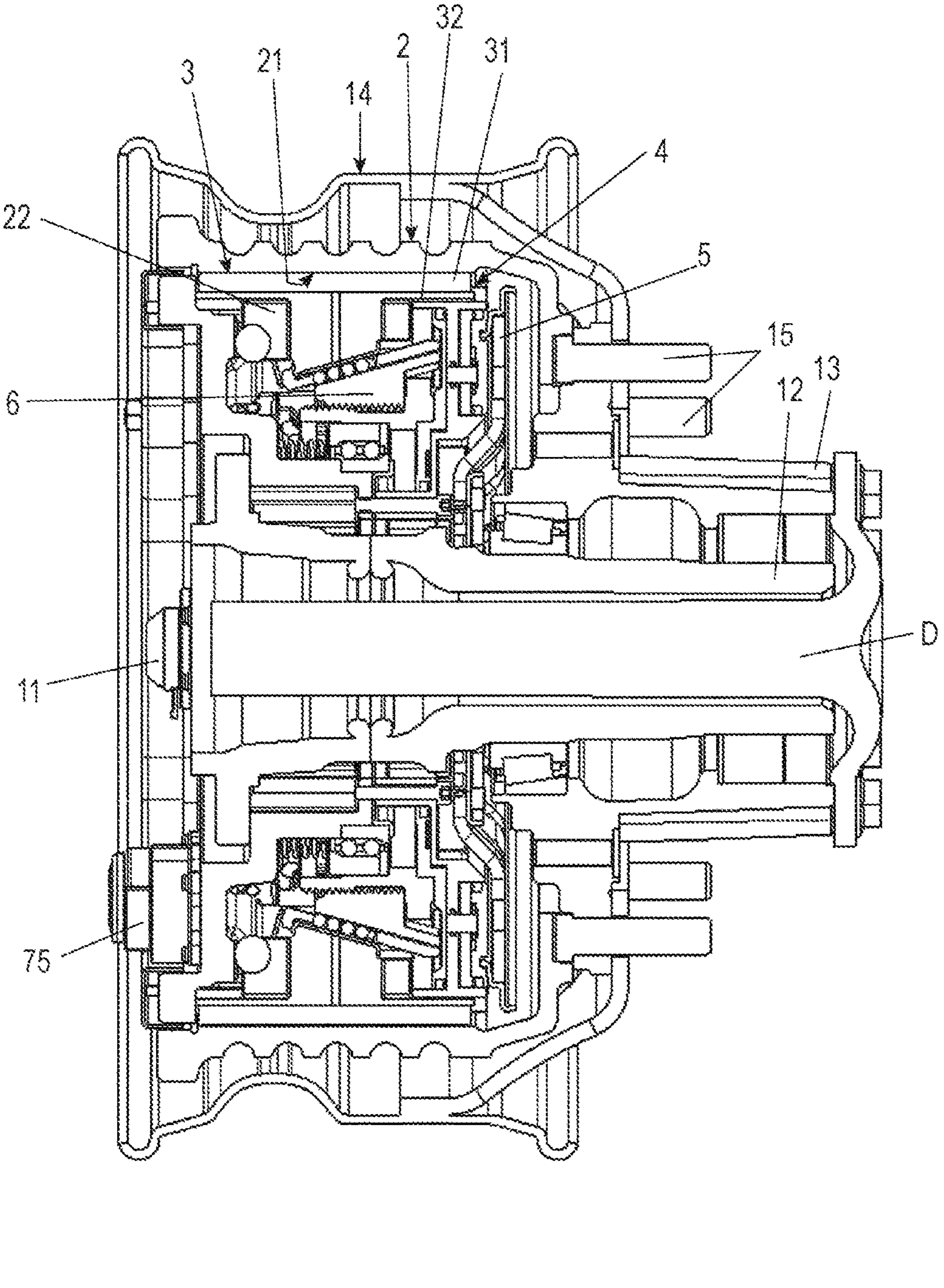
FIG. 3 shows a diagrammatic sectional illustration along the rotational axis of the drum brake with a wheel rim which engages over the drum brake.

In FIG. 1, the designation 1 denotes one design variant overall of a drum brake according to the invention. The drum brake 1 has a brake drum 2 which is mounted rotatably about a rotational axis D and, as shown in FIG. 3, is connected fixedly for conjoint rotation to a hub 13 and a rim 14 which encloses the brake drum 2 radially.

A plurality of brake shoes 3 which are mounted in a receiving space 22 of the brake drum 2 with a respective friction lining carrier 32 and a friction lining 31 arranged on the latter are arranged in a space radially within the brake drum 2.

In order to carry out a braking operation, the brake shoes 3 can be pressed radially with respect to the rotational axis D of the brake drum 2 onto a shell inner surface 21, configured as a friction surface, of the brake drum 2.

A brake cylinder arrangement 4 which is arranged fixedly on an armature housing 8 for conjoint rotation in the receiving space 22 of the brake drum 2 serves to carry out this radial pressing movement of the brake shoes 3 onto the shell inner surface 21 of the brake drum 2.

As is shown in detail in FIGS. 3 to 6, the brake cylinder arrangement 4 preferably has a housing 41 which is fastened to the armature housing 8 in a stationary manner in the receiving space 22 of the brake drum 2.

Relative to this housing 41, a service brake piston 42 is arranged displaceably parallel to the rotational axis D of the brake drum 2.

Furthermore, the brake cylinder arrangement 4 has a parking brake piston 43 which can be displaced relative to the housing 41 parallel to the rotational axis D of the brake drum 2, and can be loaded with the spring force of a spring element 5.

Figure 2:
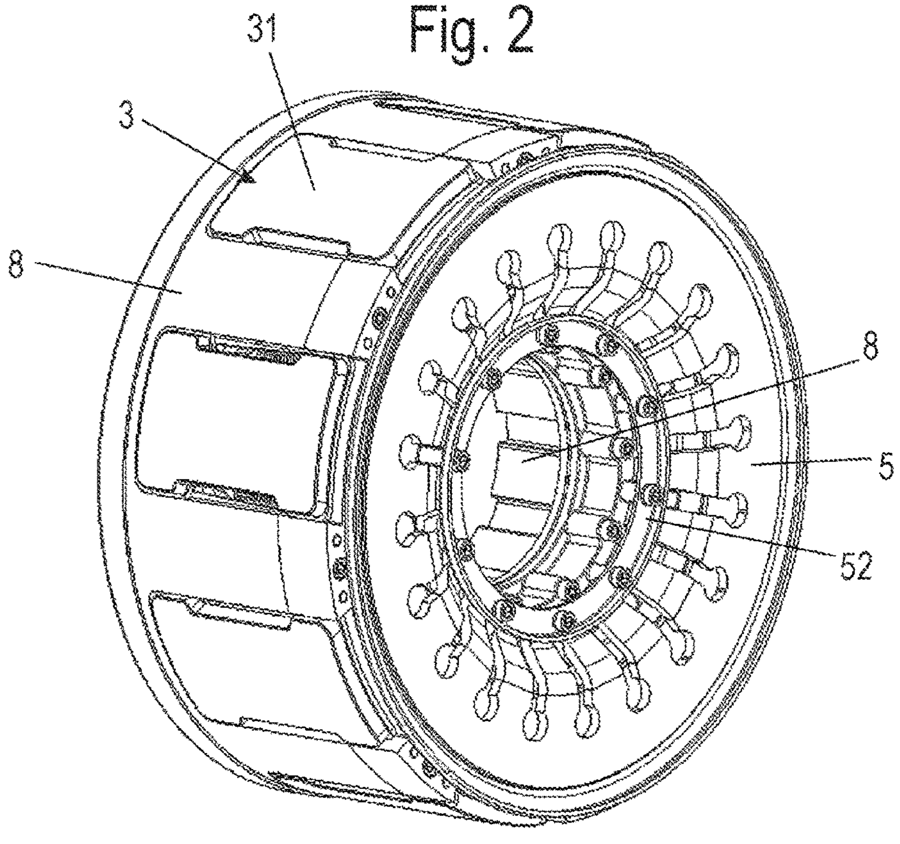
FIG. 2 shows an isometric illustration of the drum brake according to FIG. 1 with a hidden brake drum in order to illustrate the arrangement of the brake shoes.

Here, the spring element 5 is preferably configured as a disk spring which is fixed in the housing 41, as is also shown in FIG. 2 by way of example.

Furthermore, the brake cylinder arrangement 4 has a plurality of plungers 44 which serves to transmit a movement of the parking brake piston 43 to the service brake piston 42.

Furthermore, compressed air feeds are provided which firstly open into a service brake pressure space 45 between the housing 41 and the service brake piston 42, and secondly open into a parking brake pressure space 46 between the housing 41 and the parking brake piston 43.

FIG. 1 shows a first pressure fluid inlet 81 and a second pressure fluid inlet 82 for the feed/discharge of the compressed air into the service brake pressure space 45 and the parking brake pressure space 46, respectively.

Here, the movement of the service brake piston 42 is always important for the actuation of the brake shoes 3, which movement, in the case of intended throttling of the speed of the utility vehicle, what is known as a service brake operation, is brought about by way of compressed air feeding into the service brake pressure space 45.

In the case of intended locking of the brake which serves to prevent unintended rolling away of the utility vehicle in a parking situation, compressed air which is present in the parking brake pressure space 46 during driving operation is discharged from the parking brake pressure space 46, which has the consequence of a displacement of the parking brake piston 43 in the direction of the service brake piston 42. The displacement is caused by way of the exertion of force of the spring element 5 on a rear side, facing away from the service brake piston 42, of the parking brake piston 43.

In order to transmit the movement of the service brake piston 42 to the brake shoes 3, a respective pressure wedge 33 is arranged as part of a respective brake shoe 3 on a side of the friction lining carrier 32 which faces away from the friction lining 31.

Here, this pressure wedge 33 lies on a tapered ring 6 which can be displaced parallel to the rotational axis D of the brake drum 2.

Here, the tapered ring 6 can be displaced parallel to the rotational axis D of the brake drum 2 out of a non-braking position into a braking position by way of displacement of the service brake piston 42 of the brake cylinder arrangement 4.

Figure 4:
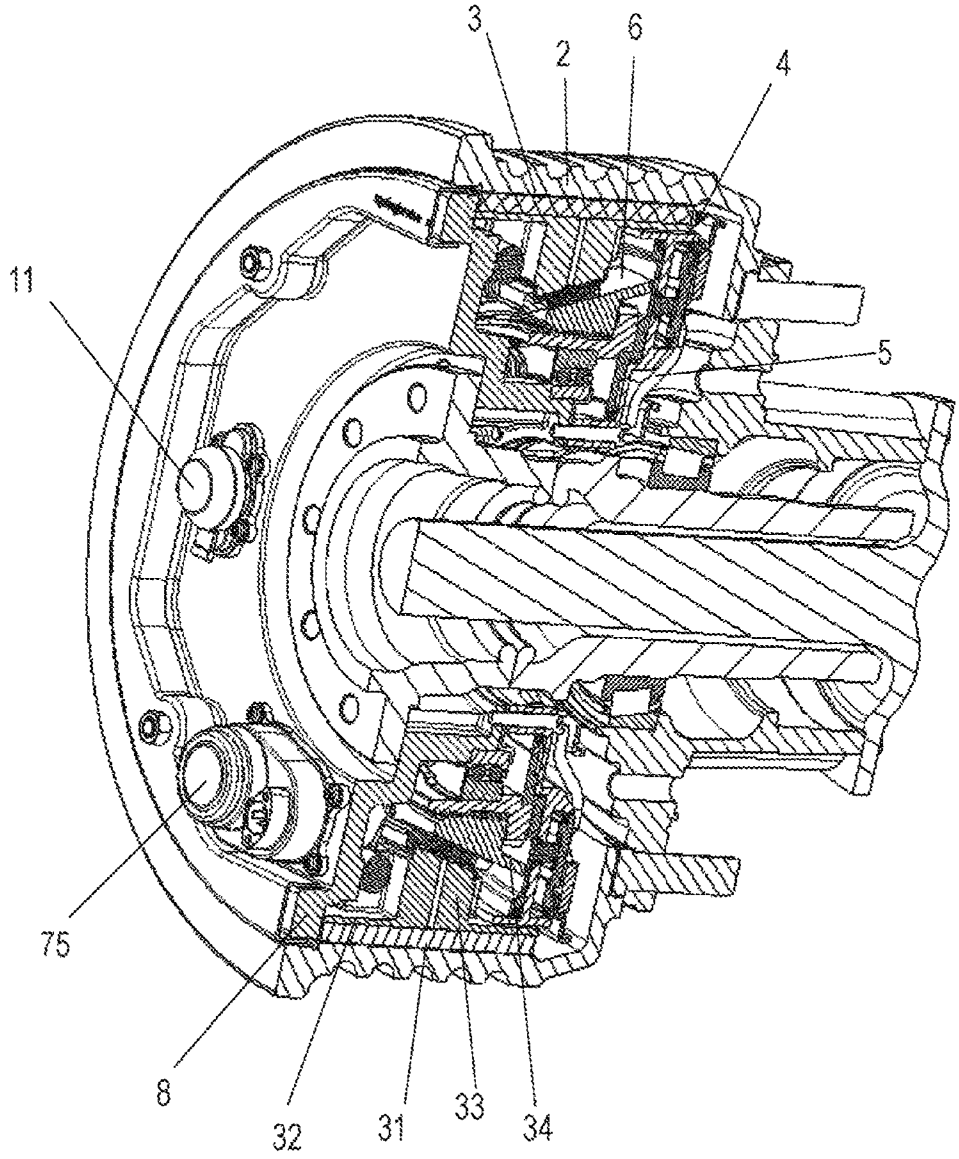
FIG. 4 shows an isometric sectional view of the drum brake which is shown in FIG. 1.
Figure 5:
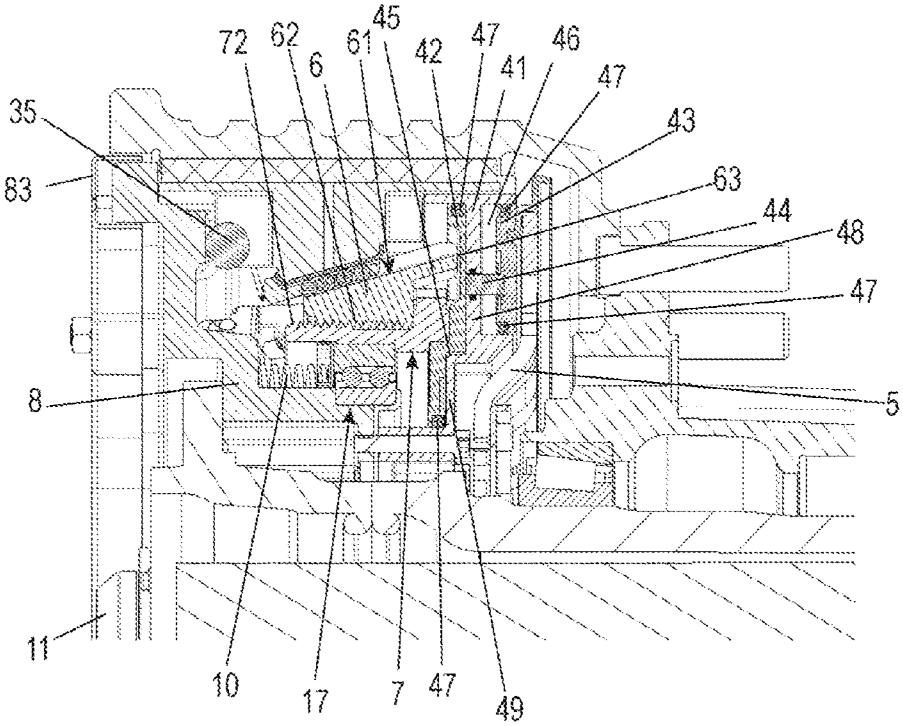
FIG. 5 shows a sectional view of an enlargement of a detail of the drum brake which is shown in FIG. 4.
Figure 6:
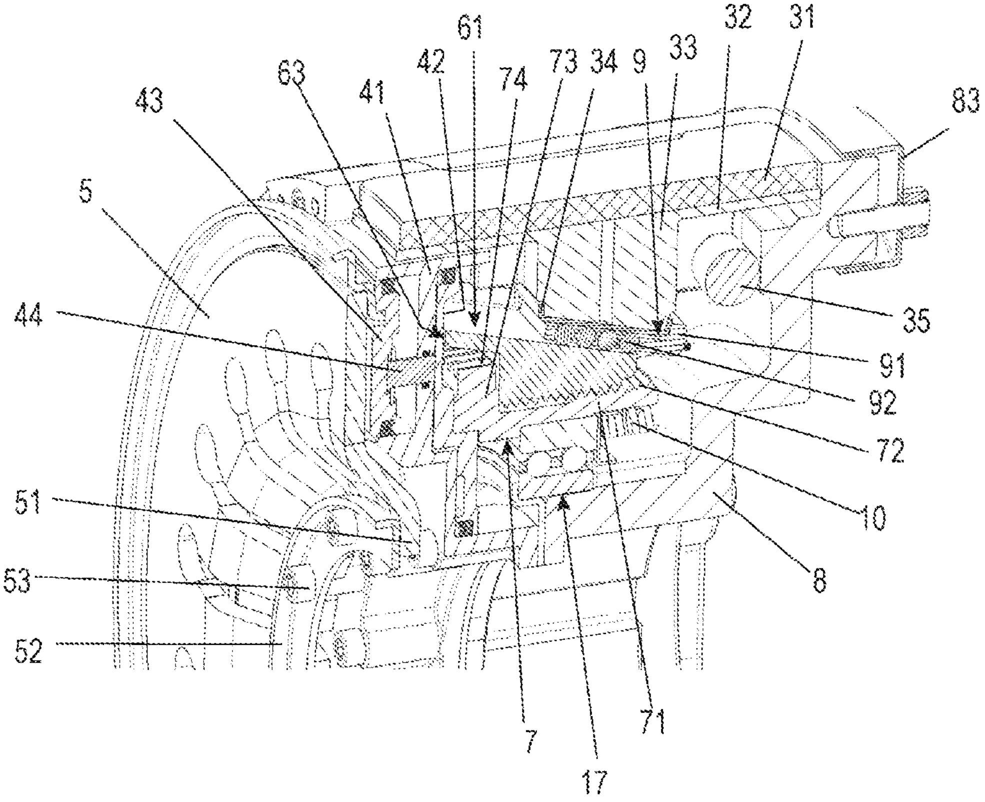
FIG. 6 shows an isometric sectional view of the illustration of the drum brake according to FIG. 2 with a hidden brake drum.

As can be seen in FIGS. 4 to 6, furthermore, the tapered ring 6 can be adjusted via an adjusting device 7.

In the case of the preferred design variant which is shown here, a thread 62 is arranged, in particular molded, on a surface of the tapered ring 6 which faces away from the pressure wedge 33, which thread 62 meshes with a threaded sleeve 71 of the adjusting device 7.

Here, the threaded sleeve 71 can be displaced together with the tapered ring 6 by way of displacement of the service brake piston 42 of the brake cylinder arrangement 4 parallel to the rotational axis D of the brake drum 2.

In order to couple the service brake piston 42 to the threaded sleeve 42, an end surface of the threaded sleeve 71 bears against the service brake piston 42. Here, the tapered ring 6 is always pressed in the direction of the service brake piston 42 by way of a spring element 10 (shown in FIGS. 5 and 6).

Here, as mentioned above, the movement of the brake shoes 3 back out of the braking position into the non-braking position is ensured by way of the spring element 10 which, as can be seen in FIGS. 5 and 6, for example, is supported on a bearing portion of the armature housing 8 and presses against a shoulder of the threaded sleeve 71.

An adjuster drive 75 preferably serves to maintain a running clearance which is as constant as possible between the friction linings 31 of the brake shoes 3 and the shell inner surface 21 of the brake drum 2.

Here, the adjuster drive 75 is preferably coupled to a toothed rim 73 of the threaded sleeve 71. In the case of the design variant which is shown here, the toothed rim 73 extends radially in a region between the end surface 63 of the tapered ring 6 and the wedge-shaped main body 64 of the tapered ring 6, on the one side of which the thread 62 which meshes with the thread 72 of the threaded sleeve 71 is molded, and the other obliquely oriented pressure surface 61 of which faces the pressure wedge 33 of the brake shoes 3.

Figure 7:
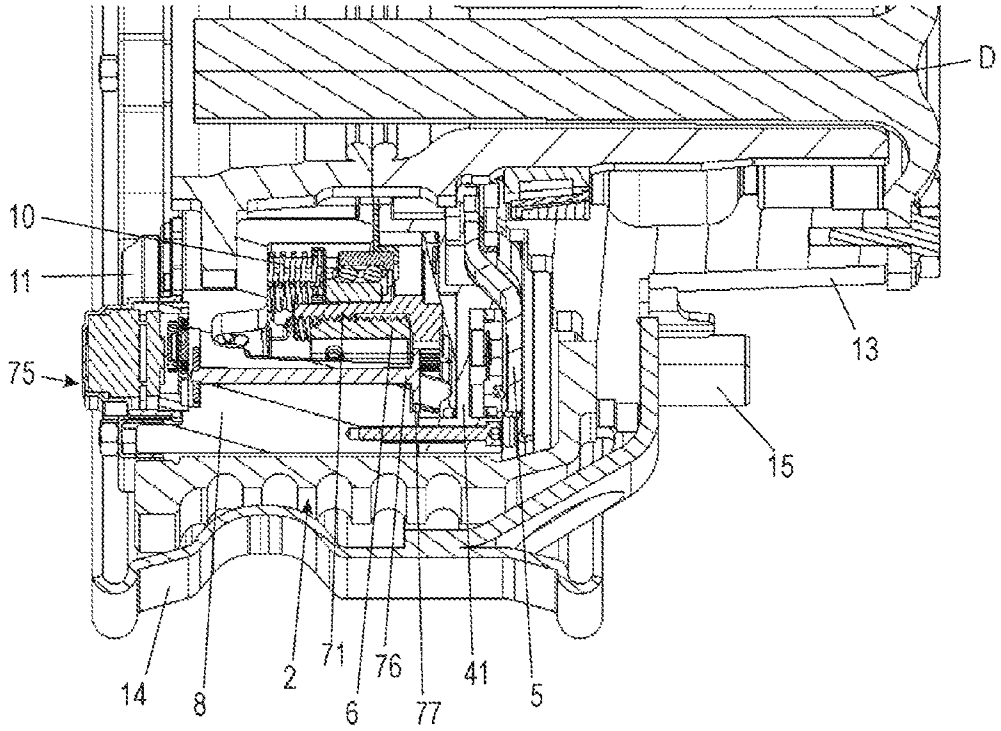
FIG. 7 shows an isometric sectional view of the illustration of the drum brake according to FIG. 1 in a further sectional plane.

The toothing system 74, molded radially on the outside here, of the toothed rim 73 meshes with a gearwheel 77, arranged on an adjuster shaft 76 and shown in FIG. 7, of the adjuster drive 75.

In order to decrease the friction between the brake shoes 3 and the tapered ring 6, a slide with a plurality of rolling bodies 92 is arranged between the pressure surface 61 of the tapered ring 6 and the pressure wedge 33 of the respective brake shoes 3 in the case of the design variant which is shown here.

Figure 8:
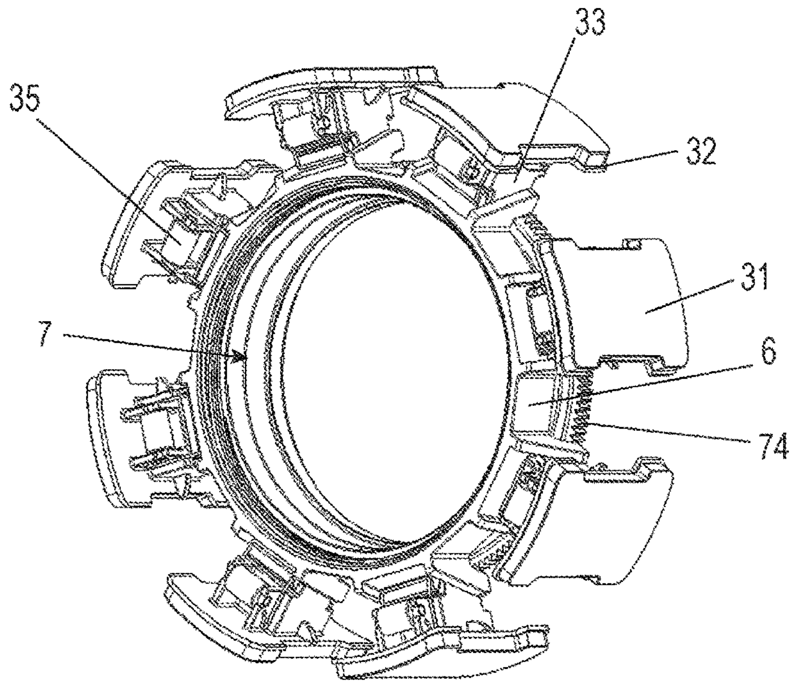
FIG. 8 shows an isometric illustration of the brake shoes which are arranged in annular manner, arranged on the tapered ring which lies on the threaded sleeve.
Figure 9:
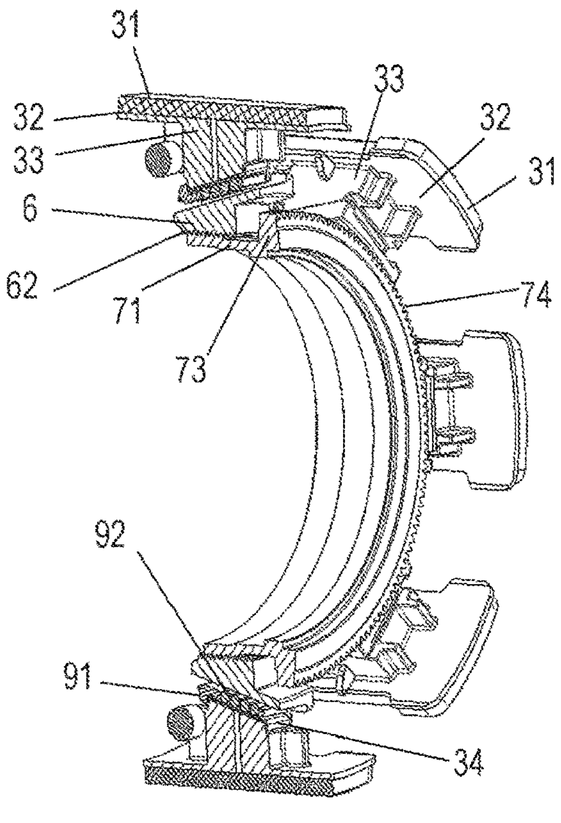
FIG. 9 shows an isometric sectional view, rotated with respect to FIG. 7, of the arrangement which is shown in FIG. 7.
Figure 10:
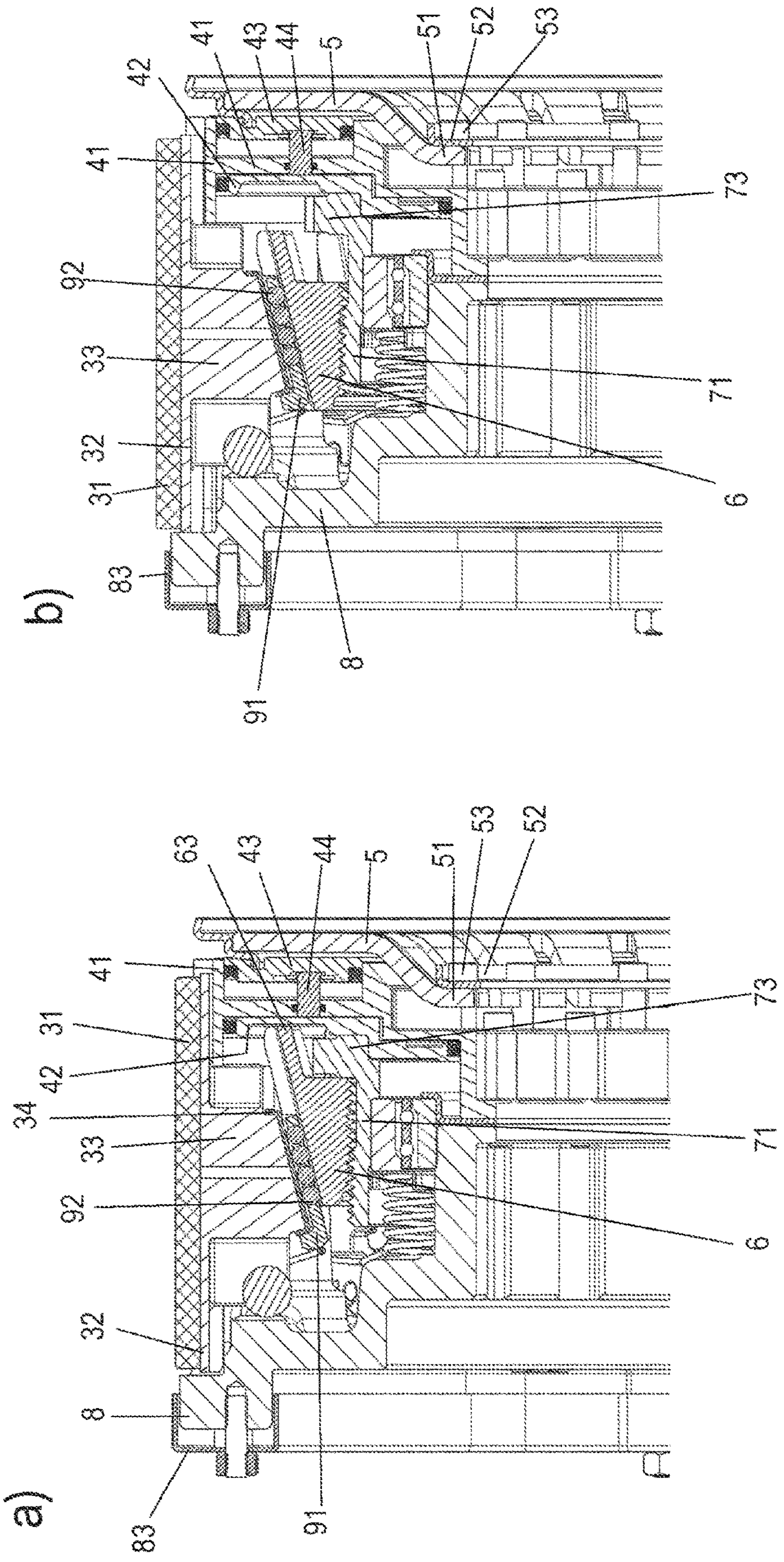
FIGS. 10*a*-10*d* show sectional illustrations of a detail of the drum brake in an analogous manner with respect to FIG. 5 in different functional positions.
Figure 10:
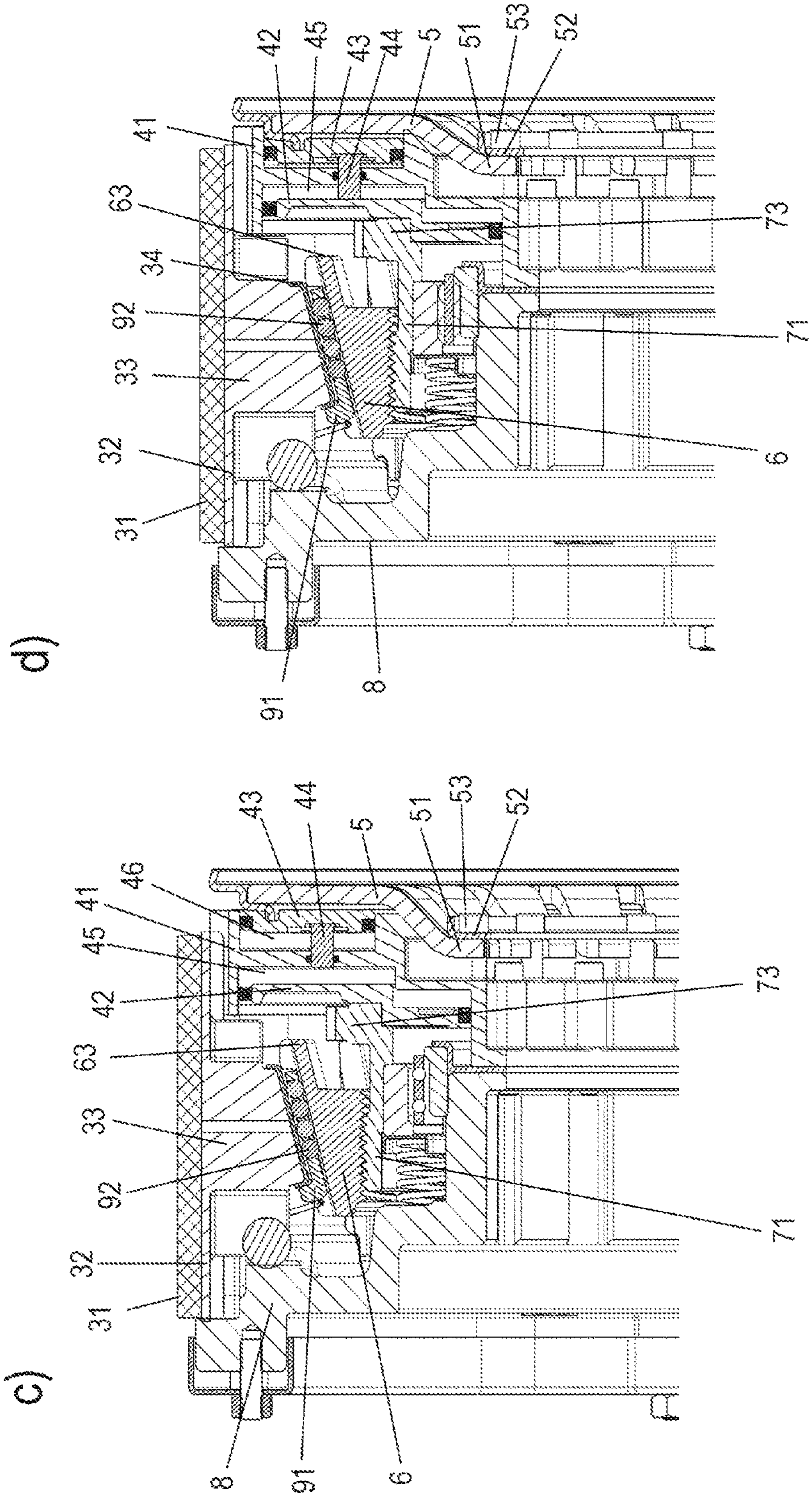
Figure 11:
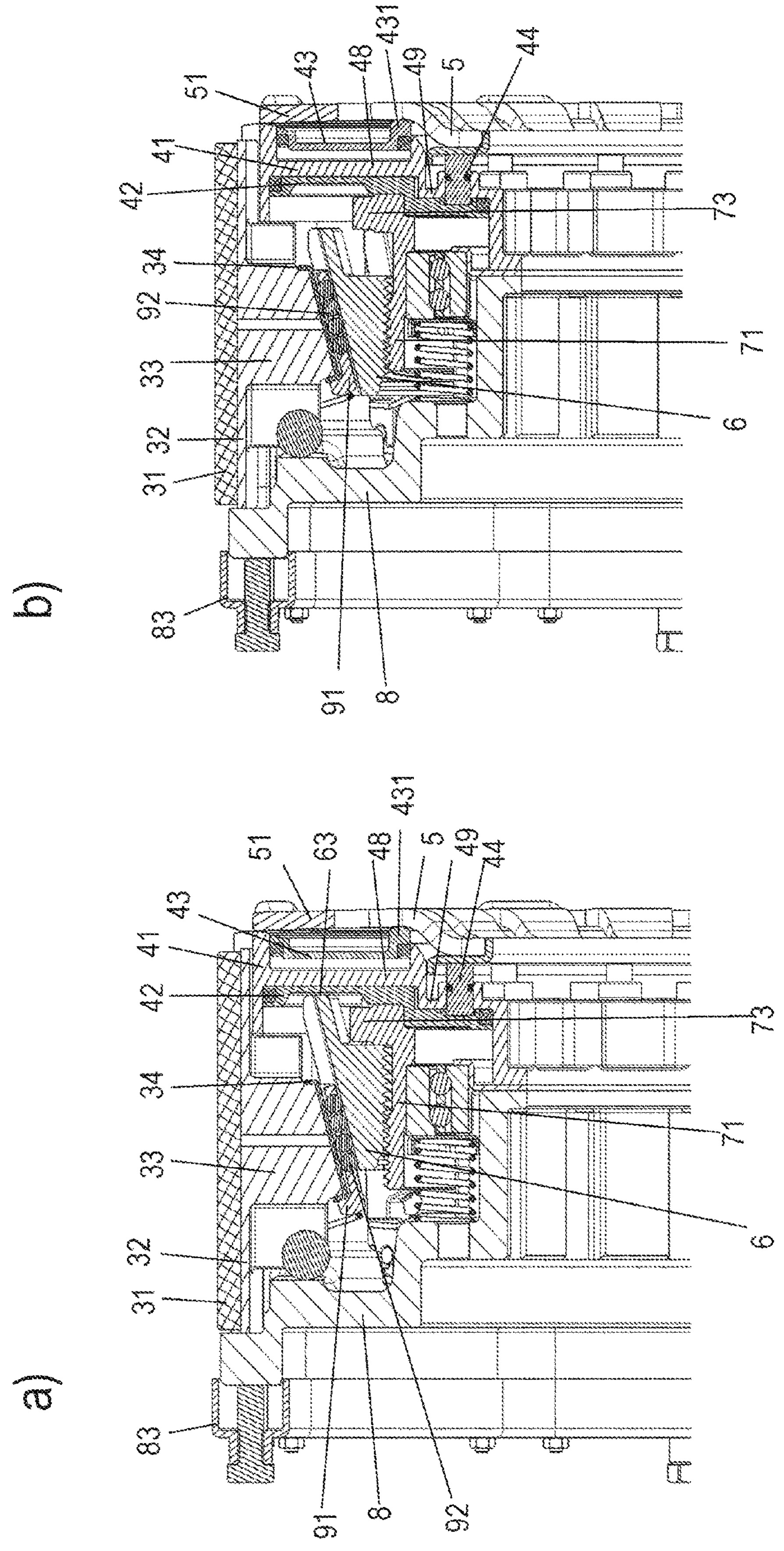
FIGS. 11*a*-11*d* show illustrations, corresponding to FIGS. 10*a*-10*d*, of the drum brake in an alternative design variant.
Figure 11:
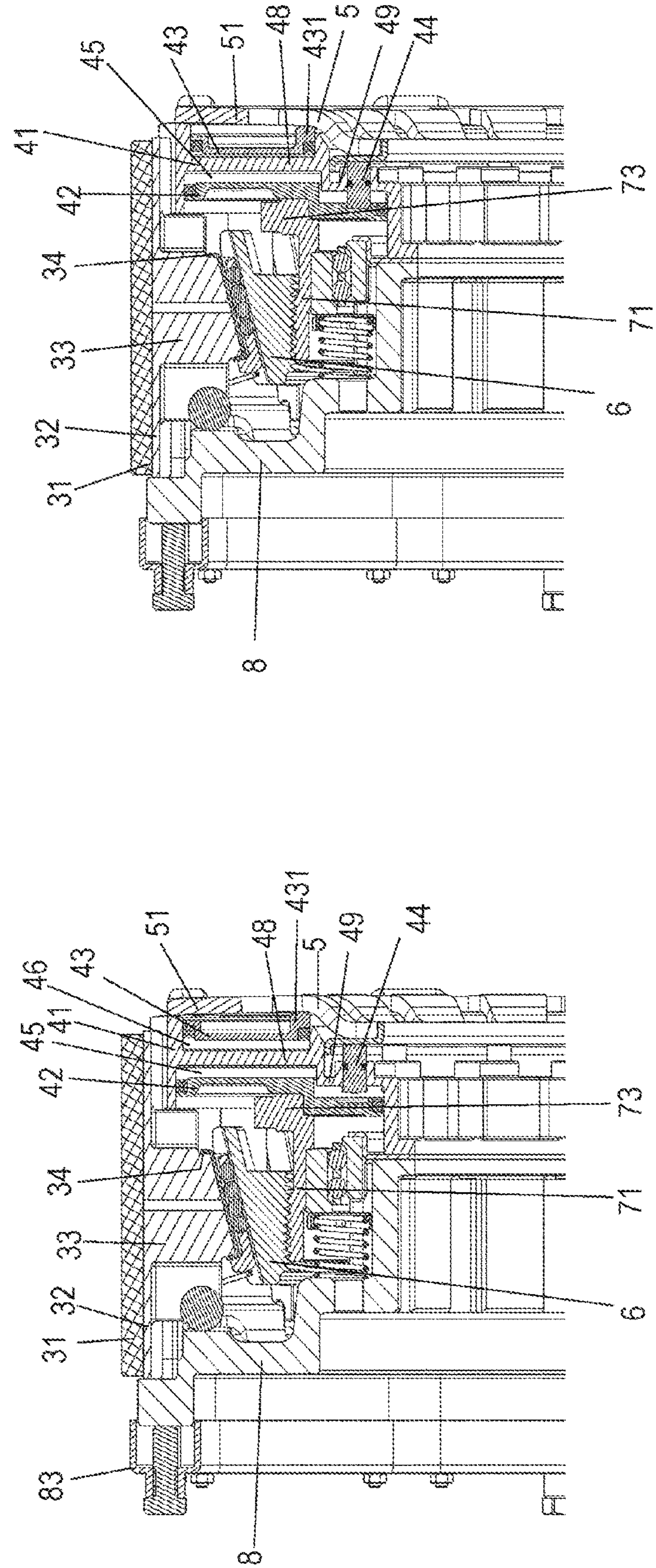
Figure 12:
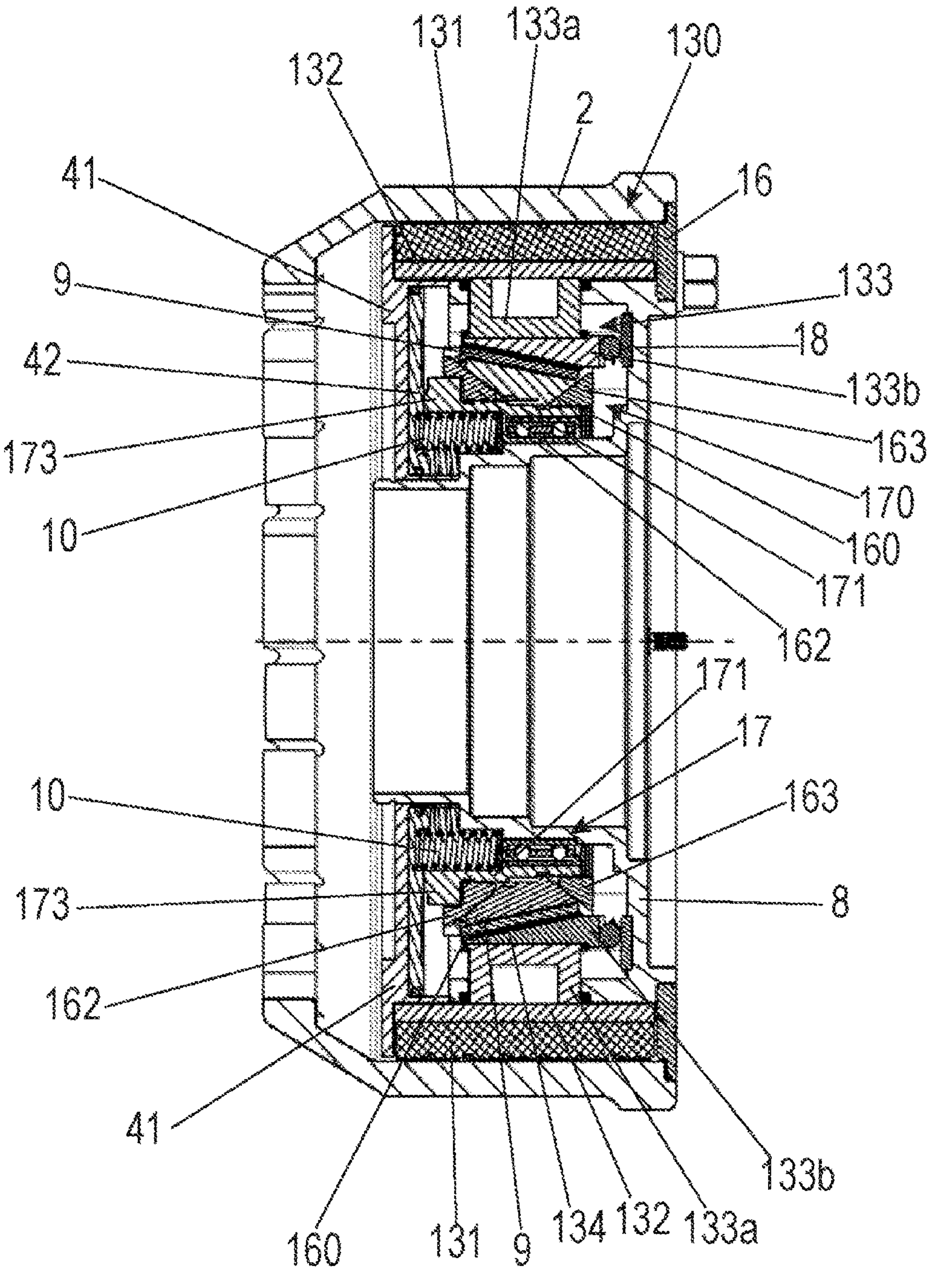
FIG. 12 shows a sectional illustration along the rotational axis of a further design variant of the drum brake.
Figure 13:
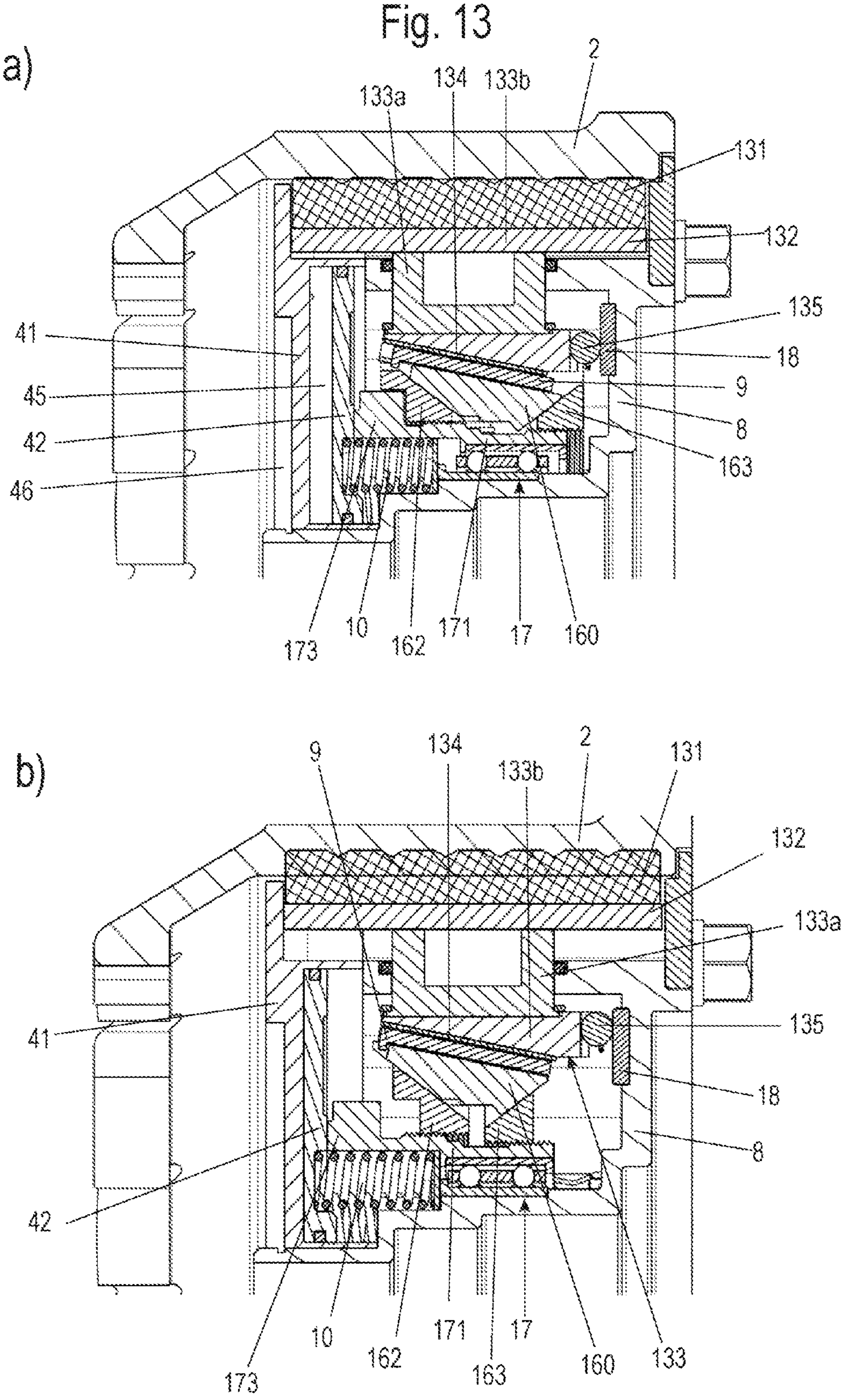
FIG. 13*a* shows a sectional illustration of a detail of the drum brake according to FIG. 12 in the service brake position.
FIG. 13*b* shows a sectional illustration of a detail of the drum brake according to FIG. 12 in a non-braking position in the case of a partially worn friction lining and a correspondingly adjusted brake shoe.
Figure 14:
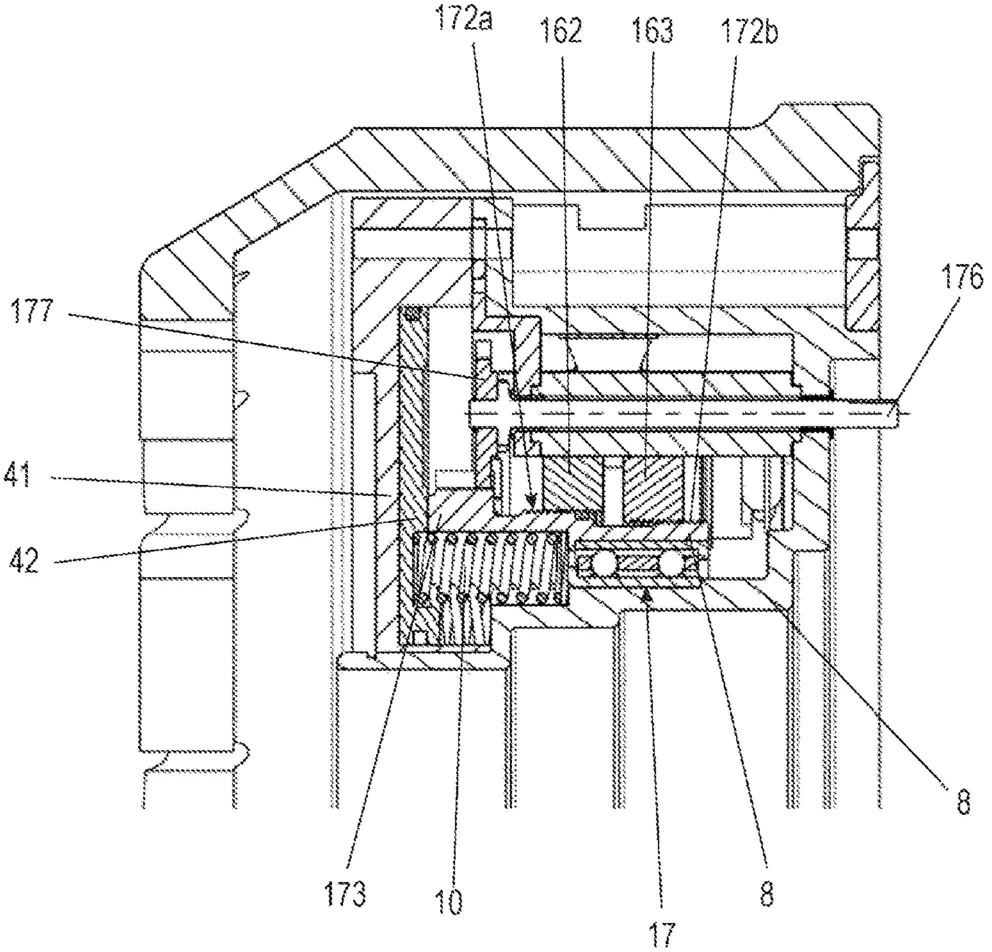
FIG. 14 shows a further sectional illustration of a detail of the drum brake according to FIG. 12 in order to illustrate the drive of the adjusting device.
Figure 15:
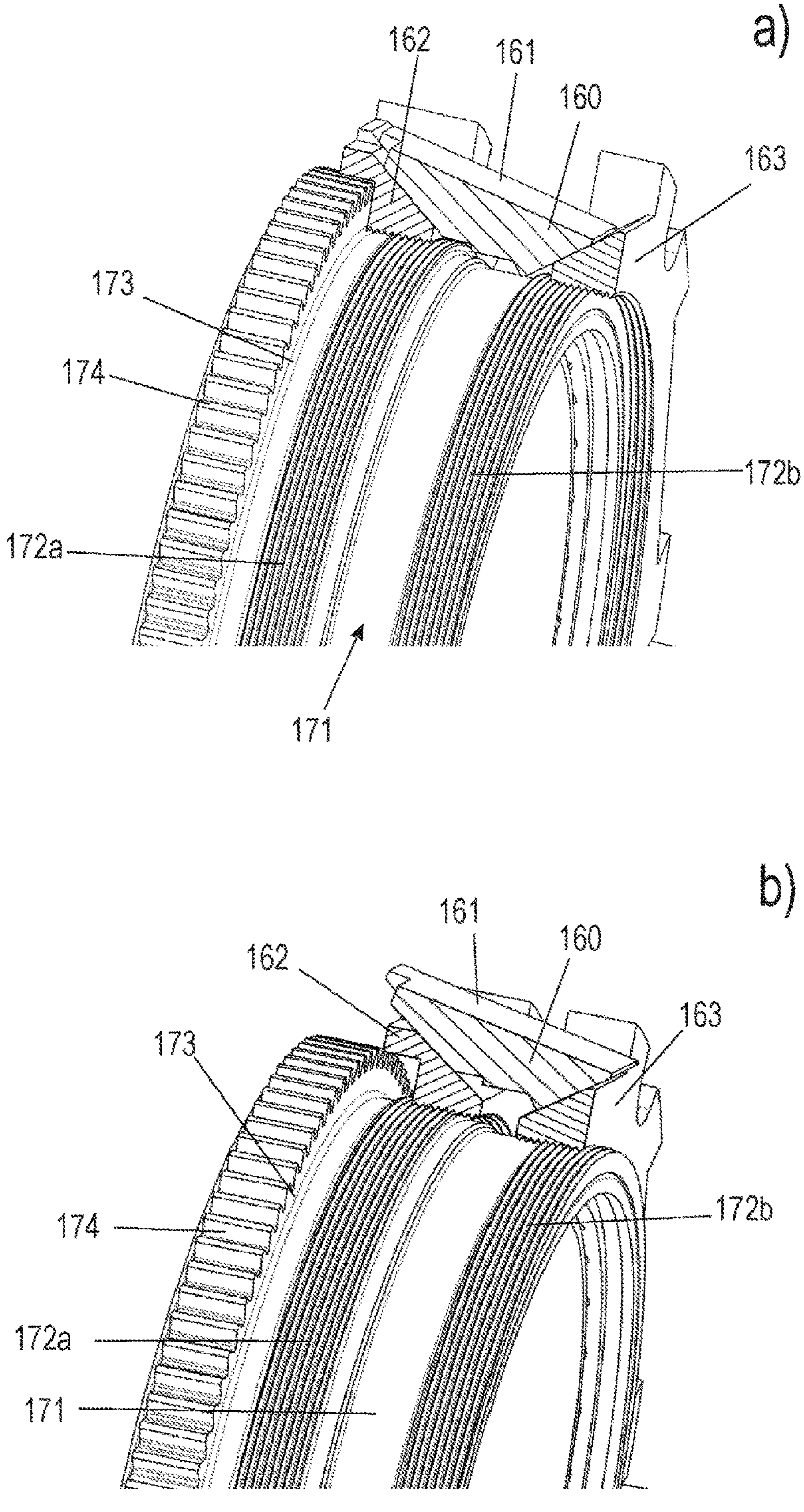
FIG. 15*a* shows an isometric illustration of a part piece of the threaded sleeve of the adjusting device of the drum brake according to FIG. 12 with adjustment rings placed on it and a wedge plate supported by the latter, in a position for an unworn friction lining.
FIG. 15*b* shows an isometric illustration of a part piece of the threaded sleeve of the adjusting device of the drum brake according to FIG. 12 with adjustment rings placed on it and a wedge plate supported by the latter, in a position for a worn friction lining.

FIGS. 8 and 9 show, as an individual illustration, the arrangement of the brake shoes 3 on the tapered ring 6 and the arrangement of the tapered ring 6 on the threaded sleeve 71 of the adjusting device 7.

Depending on the embodiment of the brake cylinder 4, the spring element 5 which is preferably configured as a disk spring can be fixed on the housing 41 of the brake cylinder 4 radially on the inside or radially on the outside.

In the case of the design variant which is shown in FIGS. 2 to 6 and 10*a* to 10*d*, the spring element 5 is thus fixed with a radially inner end region 51 radially on the inside (relative to the rotational axis D of the brake drum 2), preferably via threaded bolts 53 and a clamping ring 52.

In the case of the design variant which is shown in FIGS. 11*a* to 11*d*, the spring element 5 which is configured as a disk spring is fixed with a radially outer end region 51 radially on the outside on the housing 41 of the brake cylinder 4.

FIGS. 10*a* to 10*d* show the method of operation of the drum brake 1 with a spring element 5 fastened radially on the inside.

FIG. 10*a* thus shows a functional position of the drum brake 1, in the case of which the brake shoes 3 are situated in a non-braking position, and in the case of which the friction linings 31 are unworn or virtually unworn.

In this non-braking position, the parking brake pressure space 46 of the brake cylinder arrangement 4 is filled with compressed air. In contrast, the service brake pressure space 45 is empty, with the result that the service brake piston 42 bears against a first dividing wall 48 between the service brake pressure space 45 and the parking brake pressure space 46. The spring element 5 is prestressed by way of the compressed air which is present in the parking brake pressure space 46.

In the case of the embodiment which is shown in FIG. 10*b*, the components of the brake cylinder arrangement 4 are arranged identically to those of FIG. 10*a*. Here, the friction lining 31 of the brake shoes 3 is partially worn.

Accordingly, relative to the illustration which is shown in FIG. 10*a*, the tapered ring 6 is displaced axially a little away from the spring element 5 relative to the threaded sleeve 71 of the adjusting device 7, which brings about a slight displacement of the brake shoes 3 radially to the outside and thus sets the running clearance between the friction lining 31 and the shell inner surface 21 of the brake drum 2 to the predefined setpoint dimension independently of the lining wear.

FIG. 10*c* shows the service brake position of the drum brake 1. Relative to the position which is shown in FIG. 10*a*, compressed air has been let into the service brake pressure space 45 in order to trigger the service brake operation. As a result, the service brake piston 42 has been moved in the direction of the tapered ring 6. As a result, the tapered ring 6 is displaced and therefore presses the brake shoes 3 radially to the outside against the shell inner surfaces 21 of the brake drum 2.

Finally, FIG. 10*d* shows the state of a parking brake operation. In the case of what is known as a parking brake operation of this type, instead of feeding compressed air into the service brake pressure space 45, the compressed air which is present in the parking brake pressure space 46 is discharged from the parking brake pressure space 46. This brings it about that the spring element 5 then presses the parking brake piston 43 in the direction of the service brake piston 42.

In order to stabilize the radial movement of the brake shoes 3, a supporting roller 35 is provided on a side surface of the radially extending pressure wedge 33, as shown in FIG. 8, for example. Here, the supporting roller 35 serves to absorb that force of the service brake piston 42 which acts in the axial direction on the wedge mechanism.

The plunger 44, which is arranged on the inner side, facing the service brake piston 42, of the parking brake piston 43 and, in the case of this design variant, is received in a first dividing wall 48 of the housing 41 which separates the service brake pressure space 45 from the parking brake pressure space 46, presses the service brake piston 42 as a result axially in the direction of the tapered ring 6, and therefore presses the tapered ring 6 away from the first dividing wall 48 of the housing 41 to such an extent that the brake shoes 3 are pressed radially to the outside into the parking brake position.

In the case of the design variant which is shown in FIGS. 11*a* to 11*d*, the plunger 44 is received in a second dividing wall 49 of the housing 41 which separates the service brake pressure space 45 from the receiving space 22. Furthermore, in the case of this design variant, the spring element 5 is fixed radially on the outside on the housing 41 of the brake cylinder arrangement 4.

Here, the starting position of the brake cylinder arrangement 4, as shown in FIG. 11*a*, corresponds to the position described using FIG. 10*a*. The same applies to the partial closed position of FIG. 11*b*, reference correspondingly being made to FIG. 10*b* in order to describe the former.

The service brake operation also takes place analogously to the way described using FIG. 10*c*.

The parking brake position of FIG. 11*d* differs from the parking brake position of FIG. 10*d* in that the plunger 44 in the exemplary embodiment which is shown is then arranged radially further to the inside.

Here, the parking brake piston 43 has, radially on the inside, a ring 431 which projects axially in the direction of the spring element 5 and, by way of the discharge of the compressed air from the parking brake pressure space 46, makes it possible for the radially inner part of the spring element 5 to press the plunger 44 which is arranged in this region against the service brake piston 42 and therefore to press the brake shoes 3 onto the brake drum 2 by way of displacement of the tapered ring 6.

Furthermore, it can also be seen in FIG. 1 that a dust outlet 11 is arranged on a wall of an armature housing 8, by way of which dust outlet 11 it is made possible for brake dust which arises during braking operations to be extracted from an interior space of the drum brake 1.

The closed overall design shown here of the drum brake 1 reliably prevents brake dust from being discharged into the environment during a braking operation.

FIGS. 12 to 15*b* show a further design variant of a drum brake according to the invention.

In the case of this design variant, in contrast to that design variant of the drum brake 1 which is described on the basis of FIGS. 1 to 12 with a wedge mechanism which is configured as a tapered ring, a wedge plate 160 is provided for each of the brake shoes 130.

In order to adjust the respective brake shoe 130, the wedge plate 160 is not itself provided on its lower side with a thread which meshes on a threaded sleeve and thus, by way of movement in the axial direction, compensates for the gap size between the friction lining and the shell inner surface 21 of the brake drum 2 on account of friction lining wear, but rather has a pressure surface 161, facing the pressure wedge 133 of the respective brake piston 130, and two sliding faces oriented at an angle with respect to one another on the side which faces away from the pressure wedge 133, against which sliding faces adjustment rings 162, 163 which are each configured as a tapered ring bear.

These adjustment rings 162, 163 mesh on oppositely oriented threads 172*a*, 172*b* of a threaded sleeve 171 of the adjusting device 170. By way of the adjustment rings 162, 163 approaching one another, as can be seen clearly in FIGS. 13*a* and 13*b* or FIGS. 15*a* and 15*b*, the wedge plates are pressed radially upward and thus compensate for the gap size between the friction lining and the shell inner surface 21 of the brake drum 2 on account of friction lining wear.

It is also the case in this design variant that the threaded sleeve 171 can be displaced axially together with the wedge plates 160 and the adjustment rings 162, 163 by way of displacement of the service brake piston 42 of the brake cylinder arrangement 4 parallel to the rotational axis D of the brake drum 2, in order to carry out a service brake operation.

After the service brake operation has taken place, the restoring of the wedge plates 160 takes place in an analogous manner with respect to the design variants shown in FIGS. 1-12, preferably with the aid of the restoring spring 10 which is supported on one side on the armature housing 8 and on the other side on the service brake piston 42 of the brake cylinder arrangement 4.

In order to facilitate the displacement movement of the threaded sleeve 171, the latter is mounted relative to the armature housing 8 via an anti-friction bearing 17, as is shown, for example, in FIGS. 13*a* and 13*b*, and also in FIG. 5 and FIG. 6.

The wedge angle between the pressure wedge 133 and the pressure surface 161 of the respective wedge plate 160 or the slide 9 which is mounted between the wedge plate 160 and the pressure wedge 133 is preferably between 9° and 15°, particularly preferably approximately 11°.

The wedge angle between the sliding surfaces of the wedge plate 160 which face away from the pressure surface 161 and those sliding surfaces of the adjustment rings 162, 163 which bear against them is preferably between 30° and 40°, particularly preferably approximately 36°.

These angles can vary depending on the height to be bridged, that is to say the radial height of the friction lining 31 of the respective brake shoe 3.

Figure 16:
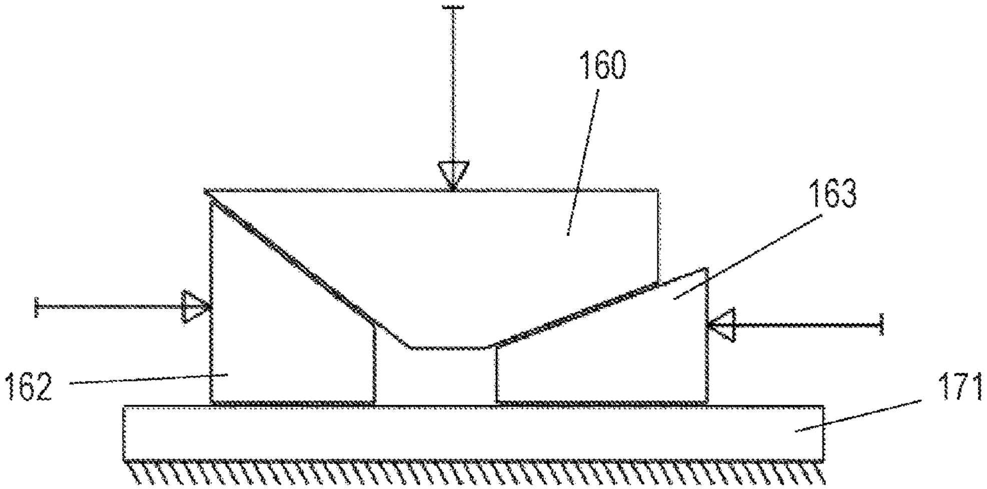
FIGS. 16 and 17 show diagrammatic illustrations of further variants of adjustment rings and wedge plates.
Figure 17:
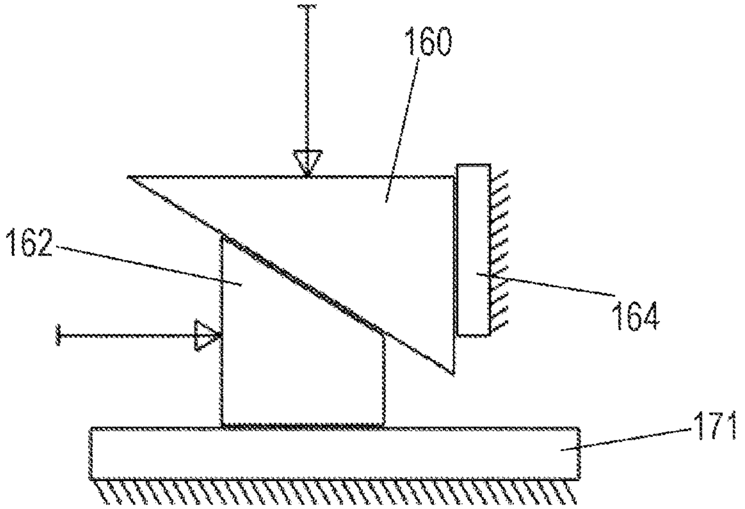

While the angle setting of the sliding surfaces of the adjustment rings 162, 163 is approximately identical in terms of magnitude in the case of the design variant shown in FIGS. 15*a* and 15*b*, it is also contemplated, as shown by way of example in FIGS. 16 and 17, for the setting angles to be of different configuration, as is shown by way of example in FIG. 16.

As shown by way of example in FIG. 17, a variant with wedge plates 160 of substantially triangular design in cross section is also contemplated, which wedge plates 160 are supported from radially below by way of a sliding surface on only one tapered ring-shaped adjustment ring 162 which, for adjustment purposes, is moved in the direction of a wall 164 which preferably projects radially on the threaded sleeve 171, with the result that the wedge plates 160 can be adjusted on the wall 164 in the radial direction in a manner which is fixed in the axial direction.

FIGS. 18-22 show two further design variants of a drum brake 1. In the case of these design variants, the wear adjustment of the brake shoes 230 does not take place by way of radial lifting of the tapered ring 260 or wedge plates shown in FIGS. 12-17, but rather via a radial adjustment of the brake shoes 230 themselves.

In contrast to the design variants shown in FIGS. 1-17, the pressure wedge 233 here is not arranged on the friction lining carrier 132 in a stationary manner via a pressure piece 133*a*, but rather the connection between the friction lining carrier 232 and the pressure wedge 233 takes place here via a piston/threaded plunger mechanism.

Figure 18:
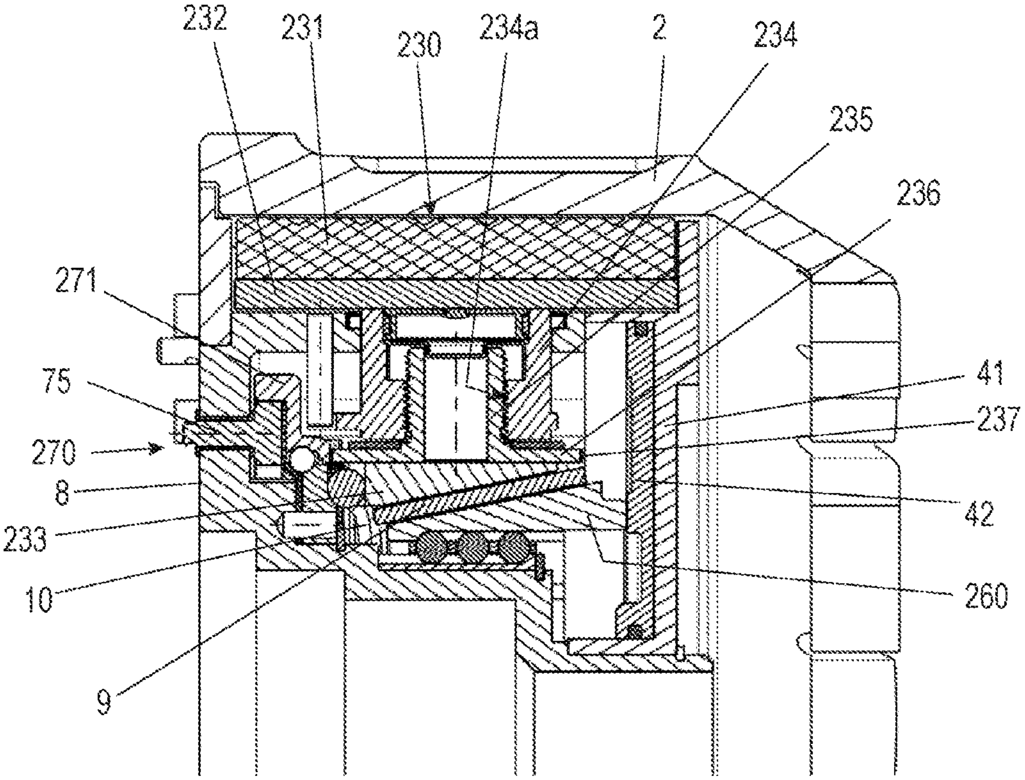
FIG. 18 shows a sectional illustration along the rotational axis of a further design variant of the drum brake.
Figure 19:
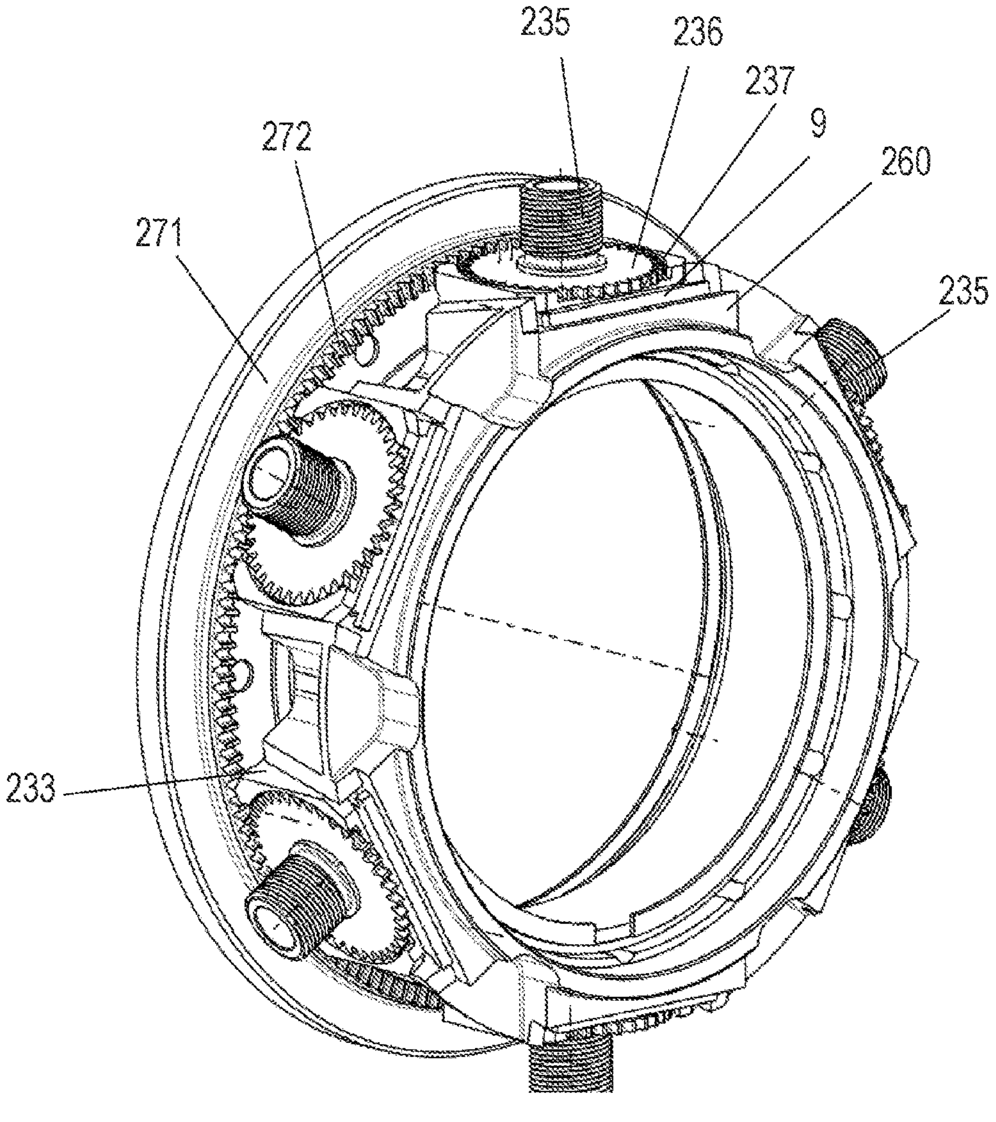
FIG. 19 shows an isometric illustration of the threaded sleeve, arranged on a tapered ring in an annular manner, for the adjustment of the pistons of the brake shoes.

In the case of the design variant shown in FIGS. 18 and 19, a piston 234 which is fixed so as not to rotate relative to the friction lining carrier 232 and has an internal thread 234*a* extends from that side of the friction lining carrier 232 of the brake shoe 230 which faces away from the friction lining 231, in which internal thread 234*a* a threaded plunger 235 which can be adjusted by way of the adjusting device 270 by rotation about a radial rotational axis is received by way of a flat foot and an external thread which can be screwed into the internal thread 234*a* of the piston 234, on which threaded plunger 235 the pressure wedge 233 of the respective brake shoe 230 is arranged.

Figure 21:
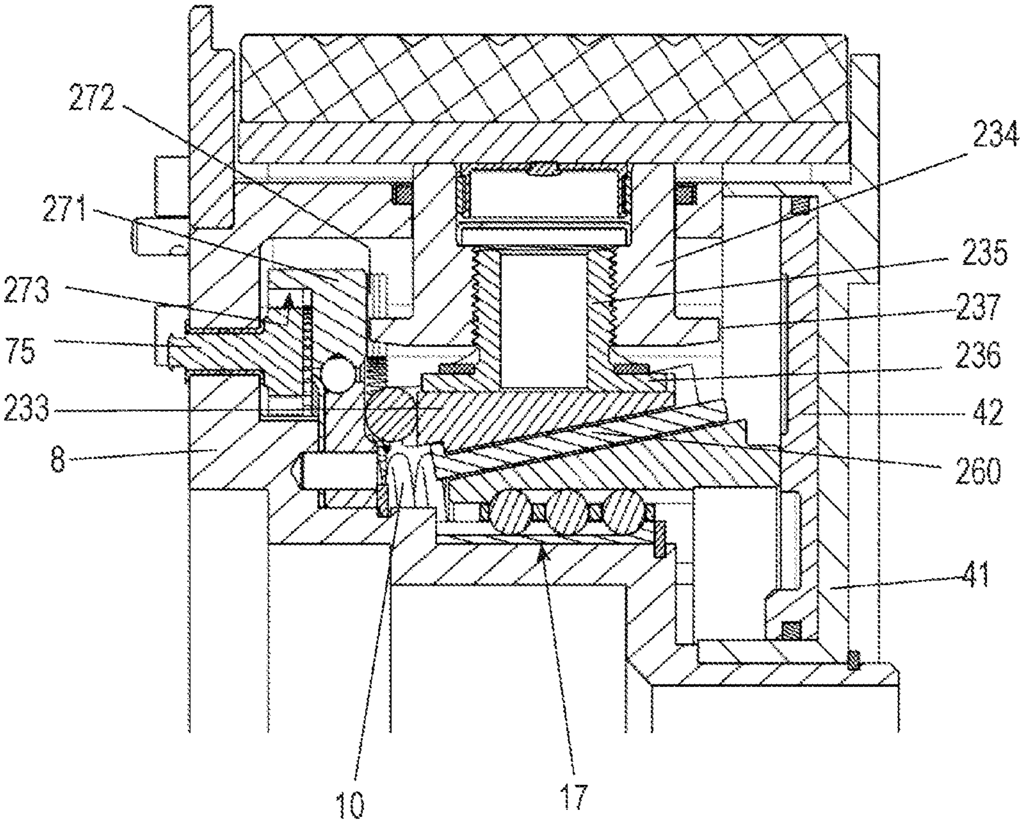
FIGS. 21-22 show illustrations, corresponding to FIGS. 18-19, of another alternative design variant of a drum brake.
Figure 22:
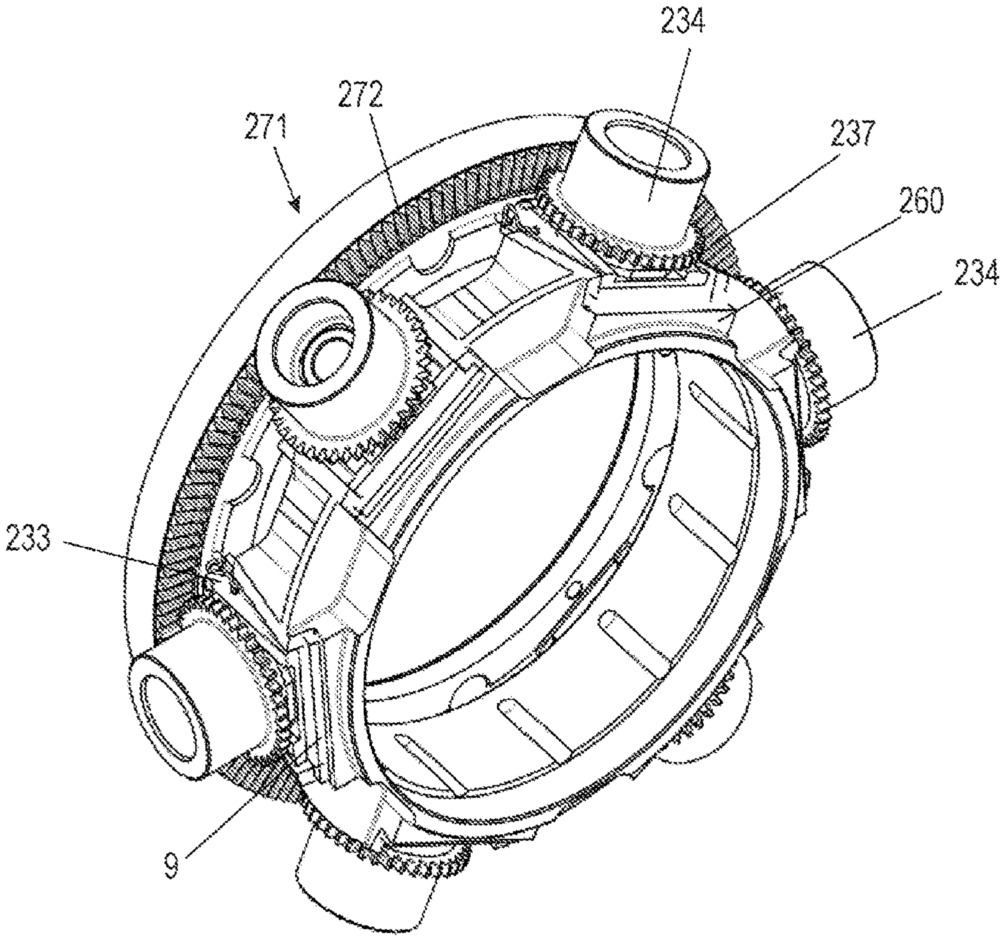

A kinematically reversed arrangement is shown in FIGS. 21 and 22. Here, a piston 234 which can be adjusted by way of the adjusting device 270 by rotation about a radial rotational axis and likewise has an internal thread 234*a* extends from the friction lining carrier 232 of the brake shoe 230, in which internal thread 234*a* a threaded plunger 235 which is fixed so as to not rotate (fixed so as to not rotate relative to the tapered ring 260) is received by way of an external thread, on the base, not configured as a gearwheel, of which threaded plunger 235 the pressure wedge 233 of the respective brake shoe 230 is arranged.

In order to perform an adjustment of the brake shoes 230, in the case of this design variant, an adjusting drive 75 is coupled via a toothed rim 271 to an external toothing system 237 of the rotatable threaded plunger 235 (in accordance with the design variant shown in FIGS. 18 and 19) or of the rotatable piston 234 (in accordance with the design variant shown in FIGS. 21 and 22) of the respective brake shoe 230.

Thus, in the case of the design variant shown in FIGS. 18 and 19, the base of the threaded plunger 235 is configured as a gearwheel 236 with an external toothing system 237.

In the case of the design variant shown in FIGS. 21 and 22, an annular web with an external toothing system 237 is molded on the shell outer surface of the piston.

Figure 20:
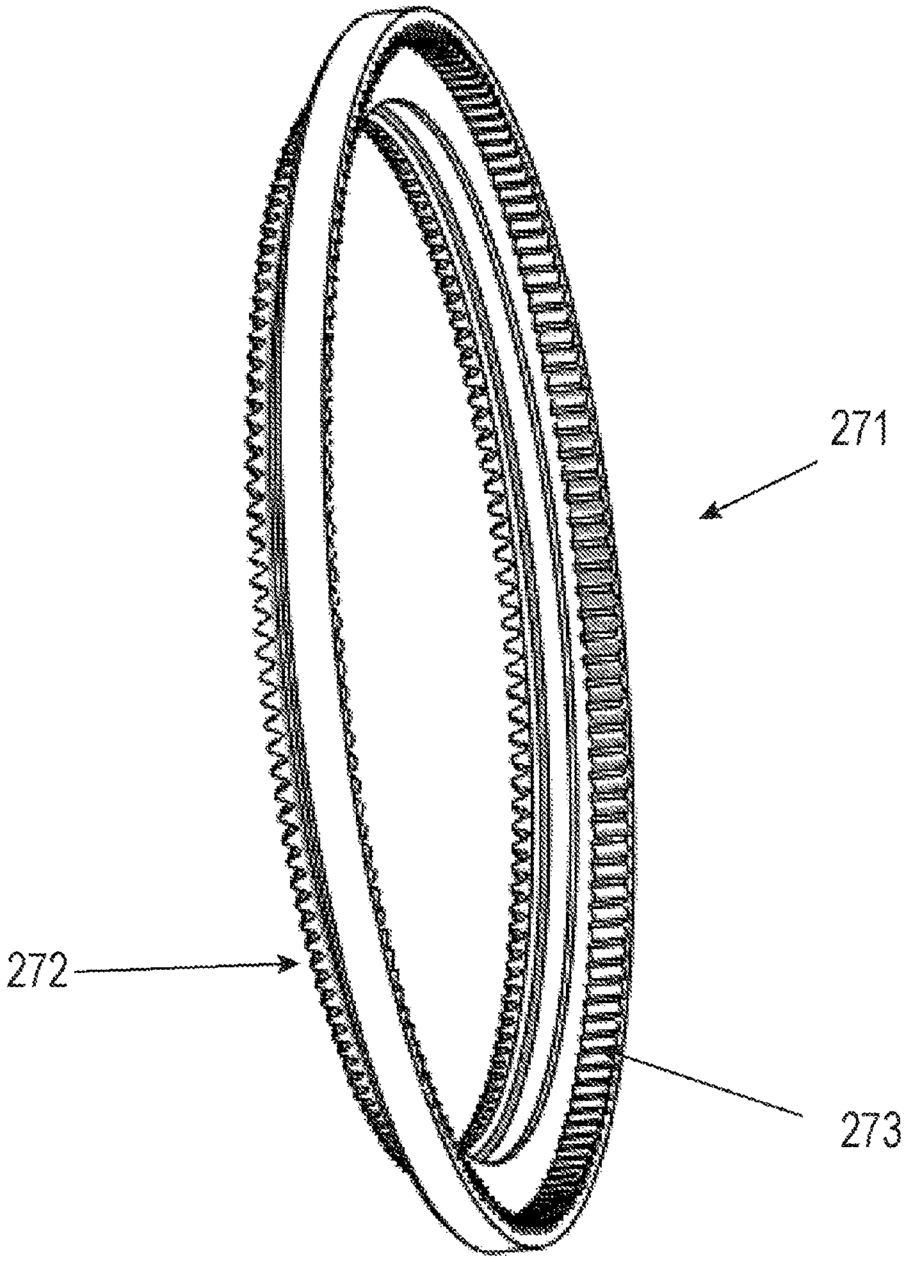
FIG. 20 shows an isometric illustration of the annular toothed rim for the drive of the threaded sleeves.

The toothed rim 271 which is shown in an individual illustration in FIG. 20 has firstly an internal toothing system 273 which, as shown in FIGS. 18 and 21, meshes with a gearwheel of the adjuster drive 75.

Furthermore, the toothed rim 271 has a crown gear toothing system 272 which meshes with the external toothing system 237 of the threaded plunger 235 or of the rotatable piston 234.

LIST OF DESIGNATIONS

1 Drum brake
2 Brake drum
21 Shell inner surface
22 Receiving space
3 Brake shoe
31 Friction lining
32 Friction lining carrier
33 Pressure wedge
34 Sliding element
35 Supporting roller
4 Brake cylinder arrangement
41 Housing
42 Service brake piston
43 Parking brake piston
44 Plunger
45 Service brake pressure space
46 Parking brake pressure space
47 Sealing ring
48 First dividing wall
49 Second dividing wall
50 Spring element
51 First end
52 Clamping ring
6 Tapered ring
61 Pressure surface
62 Thread
63 End surface
7 Adjusting device
71 Threaded sleeve
72 Thread
73 Toothed rim
74 Toothing system
75 Adjuster drive
76 Adjuster shaft
77 Gearwheel
8 Armature housing
81 First pressure fluid inlet
82 Second pressure fluid inlet
9 Slide
91 Rolling body receptacle
92 Rolling body
10 Restoring spring
11 Dust outlet
12 Axle
13 Hub
14 Rim
15 Threaded bolt
16 Locking ring
17 Anti-friction bearing
130 Brake shoe
131 Friction lining
132 Friction lining carrier
133 Pressure wedge
133*a* Pressure piece
133*b* Wedge piece
134 Sliding element
135 Supporting roller
160 Wedge plate
161 Pressure surface
162 First adjustment ring
163 Second adjustment ring
164 Wall
170 Adjusting device
171 Threaded sleeve
172*a* First thread
172*b* Second thread
173 Toothed rim
174 Toothing system
230 Brake shoe
231 Friction lining
232 Friction lining carrier
233 Pressure wedge
234 Piston
235 Threaded plunger
236 Gearwheel
237 Toothing system
260 Tapered ring
270 Adjusting device
271 Toothed rim
272 Crown gear toothing system
273 Internal toothing system
D Rotational axis
x Direction
y Direction
z Direction

The invention claimed is:

1. A drum brake for a utility vehicle, comprising:

a brake drum which is mounted rotatably about a rotational axis;

a plurality of brake shoes which are mounted in a receiving space of the brake drum, each of the plurality of brake shoes comprising a friction lining carrier and a friction lining arranged on the friction lining carrier, wherein the plurality of brake shoes are pressable radially with respect to the rotational axis of the brake drum onto a shell inner surface, configured as a friction surface, of the brake drum;

a brake cylinder arrangement which is arranged fixedly on an armature housing for conjoint rotation in the receiving space of the brake drum, for actuating the plurality of brake shoes;

a respective pressure wedge arranged on a side of each friction lining carrier which faces away from the friction lining, the pressure wedge lying on a wedge mechanism which is displaceable parallel to the rotational axis of the brake drum, wherein the wedge mechanism is displaceable out of a non-braking position into a braking position by way of displacement of a service brake piston of the brake cylinder arrangement parallel to the rotational axis of the brake drum, wherein the brake cylinder arrangement comprises:

a housing which is fastened to the armature housing in a stationary manner in the receiving space of the brake drum, the service brake piston which is displaceable relative to the housing parallel to the rotational axis of the brake drum, a parking brake piston which is displaceable relative to the housing parallel to the rotational axis of the brake drum and is loaded with a spring force of a spring element, and a plurality of plungers for transmitting a movement of the parking brake piston to the service brake piston, wherein respective compressed air feeds into a service brake pressure space are provided between the housing and the service brake piston, and respective compressed air feeds into a parking brake pressure space are provided between the housing and the parking brake piston.

2. The drum brake as claimed in claim 1, wherein the brake shoes are adjustable radially via an adjusting device.

3. The drum brake as claimed in claim 2, wherein the plurality of brake shoes are adjustable radially directly via the adjusting device.

4. The drum brake as claimed in claim 3, wherein a piston which is fixed so as not to rotate and has an internal thread extends from the friction lining carrier of the brake shoe, in which internal thread a threaded plunger which is adjustable by way of the adjusting device by rotation about a radial rotational axis is received by way of an external thread, on which threaded plunger the pressure wedge of the respective brake shoe is arranged.

5. The drum brake as claimed in claim 4, wherein the adjusting device has a toothed rim and an adjuster drive which is coupled to an internal toothing system of the toothed rim, the toothed rim having, furthermore, a crown gear toothing system which meshes with an external toothing system of the rotatable threaded plunger or of the rotatable piston of the respective brake shoe.

6. The drum brake as claimed in claim 3, wherein a piston which is adjustable by way of the adjusting device by rotation about a radial rotational axis and has an internal thread extends from the friction lining carrier of the brake shoe, in which internal thread a threaded plunger which is fixed so as not to rotate is received by way of an external thread, on which threaded plunger the pressure wedge of the respective brake shoe is arranged.

7. The drum brake as claimed in claim 6, wherein the adjusting device has a toothed rim and an adjuster drive which is coupled to an internal toothing system of the toothed rim, the toothed rim having, furthermore, a crown gear toothing system which meshes with an external toothing system of the rotatable threaded plunger or of the rotatable piston of the respective brake shoe.

8. The drum brake as claimed in claim 2, wherein the wedge mechanism is adjustable via the adjusting device.

9. The drum brake as claimed in claim 8, wherein the wedge mechanism has a tapered ring which is displaceable parallel to the rotational axis of the brake drum and on which the respective pressure wedge lies.

10. The drum brake as claimed in claim 9, wherein a thread is arranged on a surface of the tapered ring which faces away from the pressure wedge, which thread meshes with a threaded sleeve of the adjusting device, whereby the threaded sleeve is to be displaced together with the tapered ring parallel to the rotational axis of the brake drum by way of displacement of the service brake piston of the brake cylinder arrangement.

11. The drum brake as claimed in claim 1, wherein the wedge mechanism has a number of wedge plates which are displaceable parallel to the rotational axis of the brake drum, which number corresponds to the number of brake shoes.

12. The drum brake as claimed in claim 11, wherein each of the wedge plates has a pressure surface which faces the pressure wedge of the respective brake piston, and two sliding surfaces which are oriented at an angle with respect to one another and against which adjusting rings in each case bear which mesh on oppositely oriented threads of the threaded sleeve of the adjusting device, whereby the threaded sleeve is to be displaced axially together with the wedge plates and the adjustment rings parallel to the rotational axis of the brake drum by way of displacement of the service brake piston of the brake cylinder arrangement.

13. The drum brake as claimed in claim 12, wherein the threaded sleeve has a toothed rim which is coupled to an adjuster drive, whereby the wedge plates are to be adjusted radially with respect to the rotational axis of the brake drum in the direction of the shell inner surface of the brake drum by way of rotation of the threaded sleeve, by way of the adjustment rings approaching one another or the first adjustment ring approaching the wall.

14. The drum brake as claimed in claim 11, wherein each of the wedge plates has a pressure surface which faces the pressure wedge of the respective brake piston, and two sliding surfaces which are oriented at an angle with respect to one another, an adjustment ring bearing against one of the sliding surfaces, which adjustment ring meshes on a thread of the threaded sleeve of the adjusting device and bears against the other one of the sliding surfaces on a wall which projects radially out of the threaded sleeve, whereby for the threaded sleeve is to be displaced axially together with the wedge plates and the adjustment ring parallel to the rotational axis of the brake drum by way of displacement of the service brake piston of the brake cylinder arrangement.

15. The drum brake as claimed in claim 14, wherein the threaded sleeve has a toothed rim which is coupled to an adjuster drive, whereby the wedge plates are to be adjusted radially with respect to the rotational axis of the brake drum in the direction of the shell inner surface of the brake drum by way of rotation of the threaded sleeve, by way of the adjustment rings approaching one another or the first adjustment ring approaching the wall.

16. The drum brake as claimed in claim 1, wherein the plurality of plungers are received in a first dividing wall of the housing, which first dividing wall separates the service brake pressure space from the parking brake pressure space.

17. The drum brake as claimed in claim 1, wherein the plurality of plungers are received in a second dividing wall of the housing, which second dividing wall separates the service brake pressure space from the receiving space.

18. The drum brake as claimed in claim 1, wherein the spring element is configured as a disk spring which is fixed on the housing.

19. The drum brake as claimed in claim 1, further comprising:

a slide with a plurality of rolling bodies arranged between the respective pressure wedge and the wedge mechanism.

* * * * *